(12) United States Patent
Martinez-Heras et al.

(10) Patent No.: US 8,346,505 B2
(45) Date of Patent: Jan. 1, 2013

(54) METHOD AND APPARATUS FOR ANALYZING TIME SERIES DATA

(75) Inventors: José Antonio Martinez-Heras, Darmstadt (DE); Alessandro Donati, Darmstadt (DE); Kar Lam Yeung, Croydon (GB)

(73) Assignee: European Space Agency, Paris (FR)

( * ) Notice: Subject to any disclaimer, the term of this patent is extended or adjusted under 35 U.S.C. 154(b) by 336 days.

(21) Appl. No.: 12/837,882

(22) Filed: Jul. 16, 2010

(65) Prior Publication Data
US 2011/0035188 A1 Feb. 10, 2011

(30) Foreign Application Priority Data

Jul. 16, 2009 (EP) .................... 09165723

(51) Int. Cl.
*G04F 10/00* (2006.01)
*G06F 11/00* (2006.01)
(52) U.S. Cl. ........ 702/176; 702/182; 702/183; 702/184; 702/185; 702/186
(58) Field of Classification Search .......... 702/121–123, 702/176–188; 700/28–30; *G06F 1/00, 11/00; G21C 17/00*
See application file for complete search history.

(56) References Cited

U.S. PATENT DOCUMENTS
2005/0096873 A1* 5/2005 Klein ............................ 702/184
(Continued)

FOREIGN PATENT DOCUMENTS
WO  WO 2008/045190 A2  4/2008

OTHER PUBLICATIONS

Hu et al, "Multivariate Anomaly Detection in Real-World Industrial Systems," 2008 International Joint Conference on Neutral Networks, 2008, pp. 2766-2771, Neural Networks.*

(Continued)

*Primary Examiner* — Phuong Huynh
(74) *Attorney, Agent, or Firm* — Oliff & Berridge, PLC

(57) ABSTRACT

The present invention relates to a method and an apparatus for determining which one or more time series parameters of a plurality of time series parameters relating to operation of a system are correlated with a first operation state of the system. According to the invention, the method comprises providing time series data including data relating to a time series of each of the plurality of time series parameters; determining at least two first time periods, wherein the system is in the first operation state during the at least two first time periods; determining at least one second time period, wherein the system is in a second operation state during the at least one second time period; determining, for each respective time series parameter of the plurality of time series parameters, a first characteristic parameter relating to a first characteristic of the time series of the respective time series parameter for each of the at least two first time periods and the at least one second time period; and determining which one or more time series parameters of the plurality of time series parameters relating to the operation of the system are correlated with the first operation state of the system by determining, for each respective time series parameter of the plurality of time series parameters, whether or not the respective time series parameter is correlated with the first operation state of the system based on the first characteristic parameters of the respective time series parameter determined for each of the at least two first time periods and the at least one second time period.

19 Claims, 22 Drawing Sheets

U.S. PATENT DOCUMENTS

2006/0224356 A1* 10/2006 Castelli et al. .................. 702/176
2007/0028220 A1* 2/2007 Miller et al. .................. 717/124

OTHER PUBLICATIONS

E. Keogh, Exact Indexing of Dynamic Time Warping, Proceedings of the 2th International Conference on Very Large Data Bases, 2002, pp. 406-417, Hong Kong.*

E. Keogh, "Exact Indexing of Dynamic Time Warping," *Proceedings of the 28$^{th}$ International Conference on Very Large Data Bases*, 2002, pp. 406-417, Hong Kong.

F. Itakura, "Minimum Prediction Residual Principle Applied to Speech Recognition," *IEEE Transactions on Acoustics, Speech, and Signal Processing*, Feb. 1975, pp. 67-72, vol. ASSP-23, No. 1.

H. Sakoe et al., "Dynamic Programming Algorithm Optimization for Spoken Word Recognition," *IEEE Transaction on Acoustics, Speech, and Signal Processing*, Feb. 1978, pp. 43-49, vol. ASSP-26, No. 1.

X. Hu et al., "Multivariate Anomaly Detection in Real-World Industrial Systems," *2008 International Joint Conference on Neutral Networks*, 2008, pp. 2766-2771, Neutral Networks.

T. Biton et al., "MultiVariate Fault Detection (MVFD) EP/FDC Implementation," *Semiconductor Conference*, 2005, pp. 377-380.

M. Luo, "Multivariate Fault Detection with Convex Hull," *Avionics Systems Conference*, 2004, pp. 7.E.4-1-7.E.4-5.

L. Chiang et al., "Process Monitoring using Causal Map and Multivariate Statistics: Fault Detection and Identification," *Chemometrics and Intelligent Laboratory Systems*, Feb. 2003, pp. 159-178, vol. 65, No. 2, Elsevier Science Publishers B.V., Amsterdam.

* cited by examiner

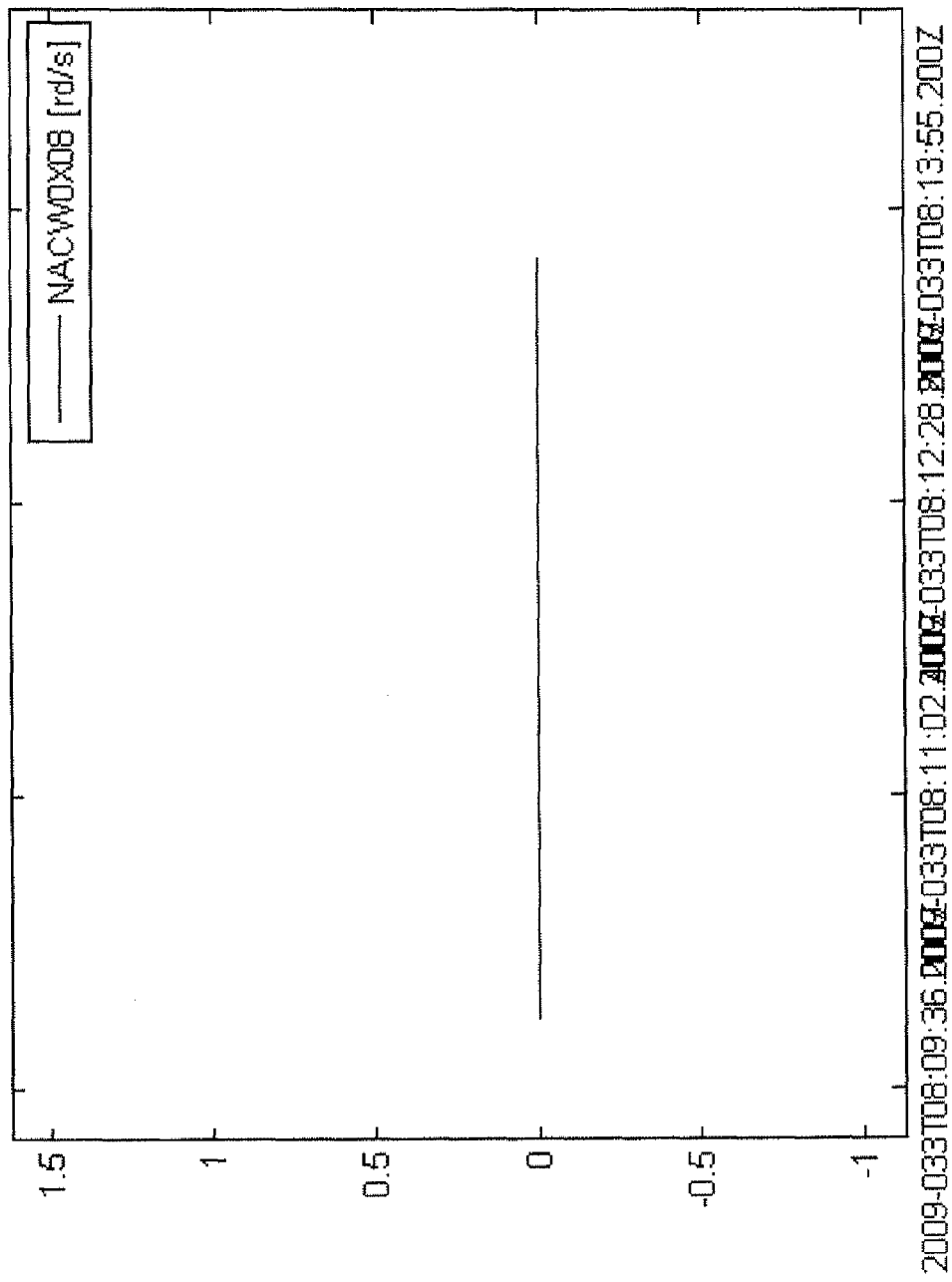

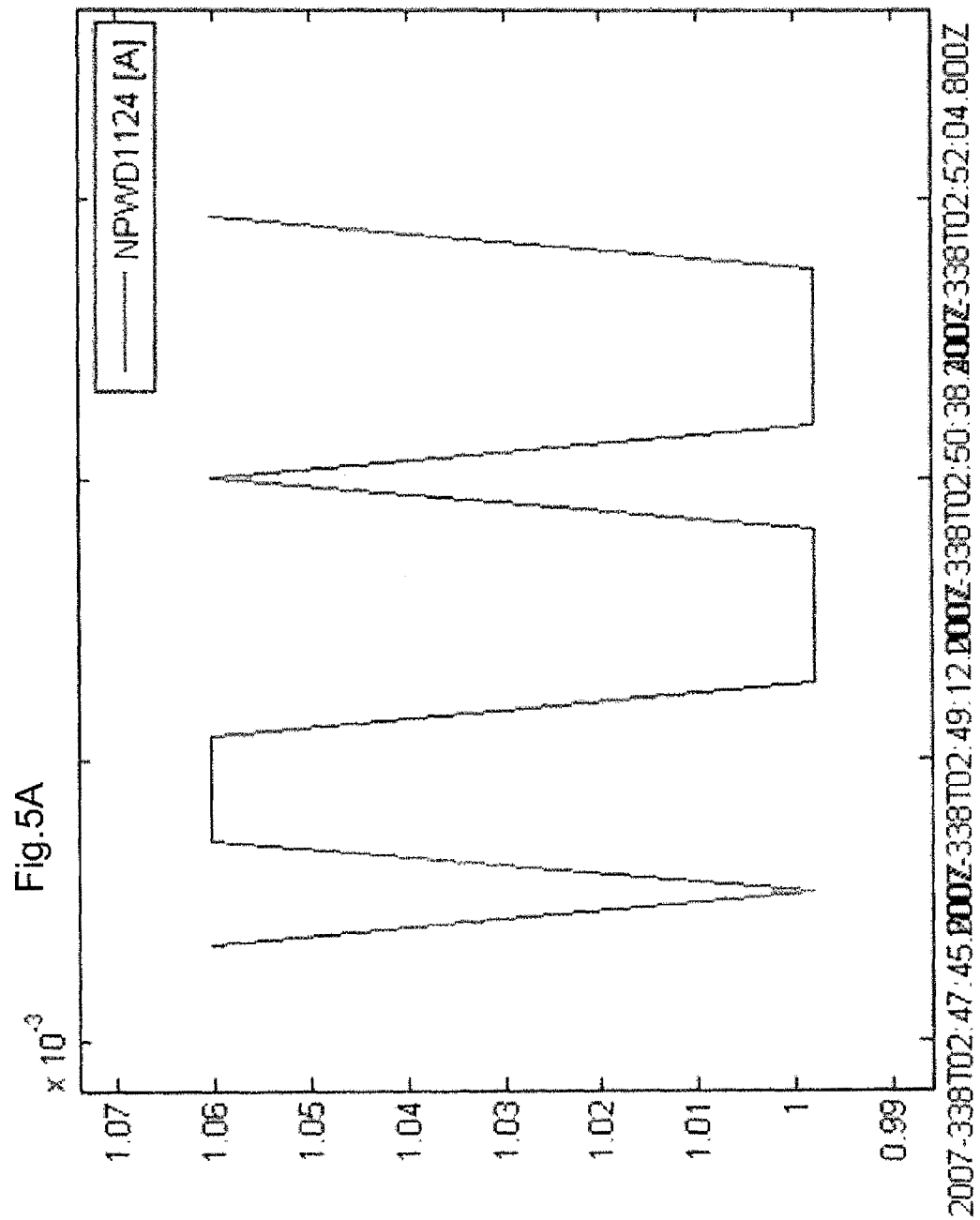

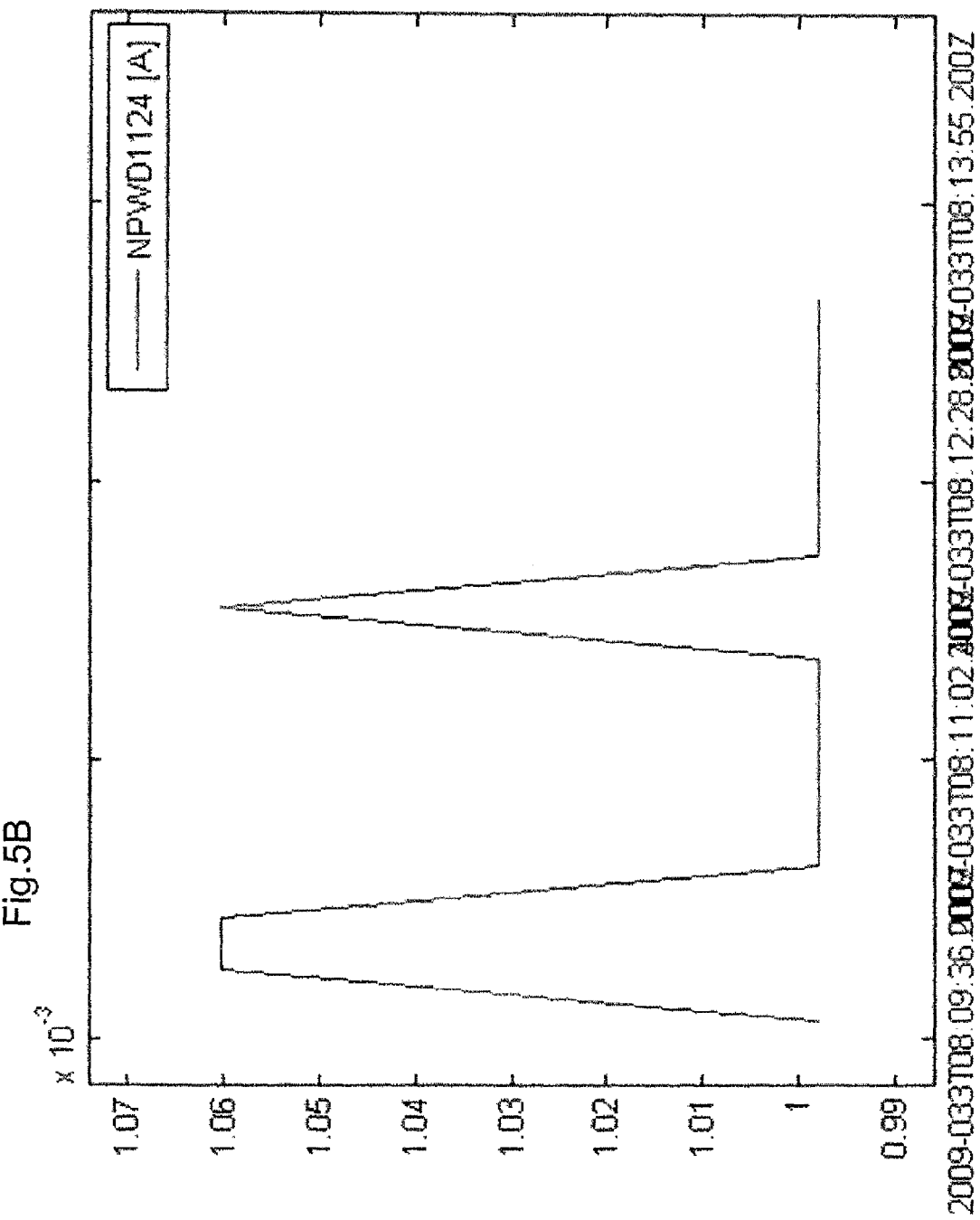

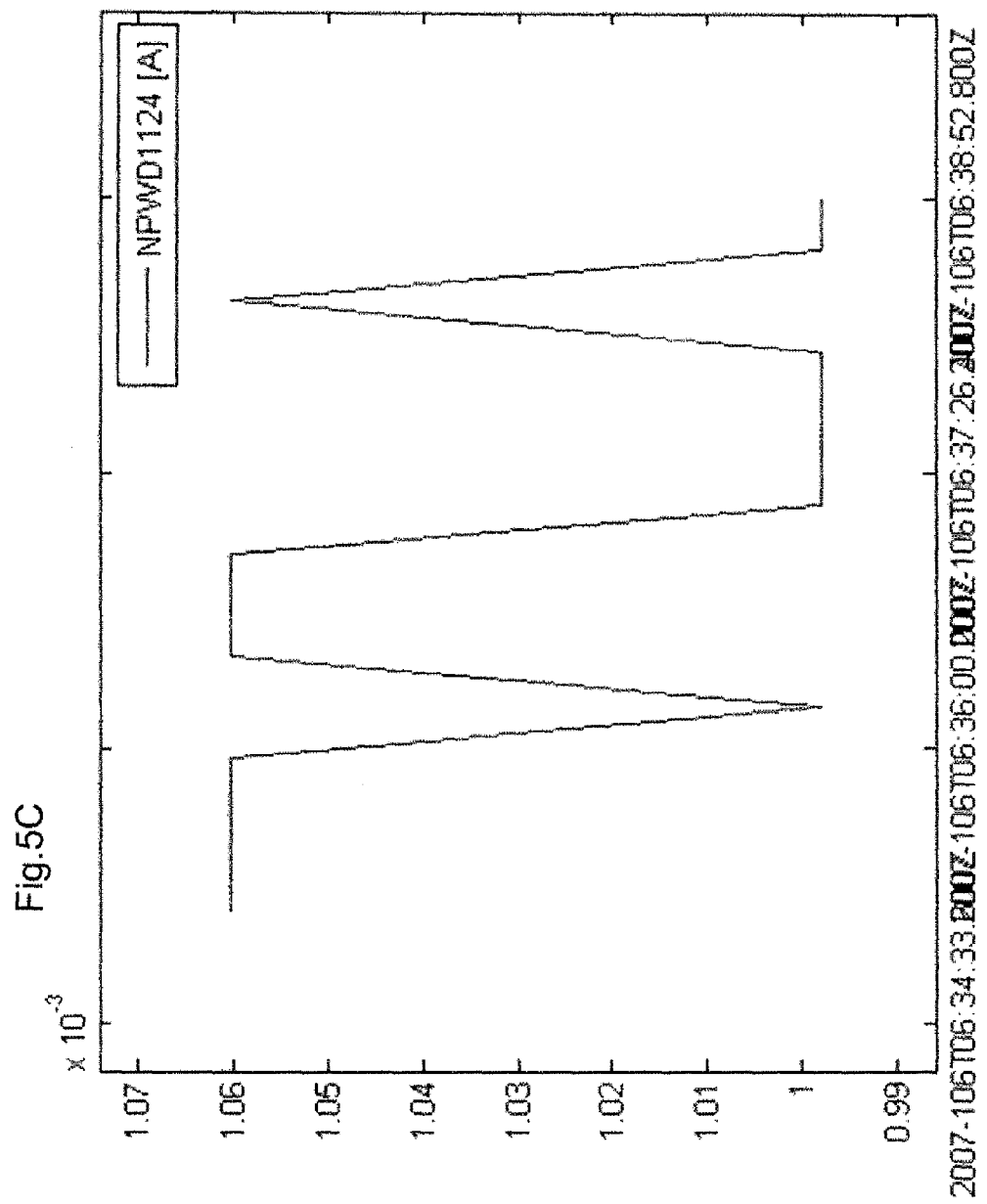

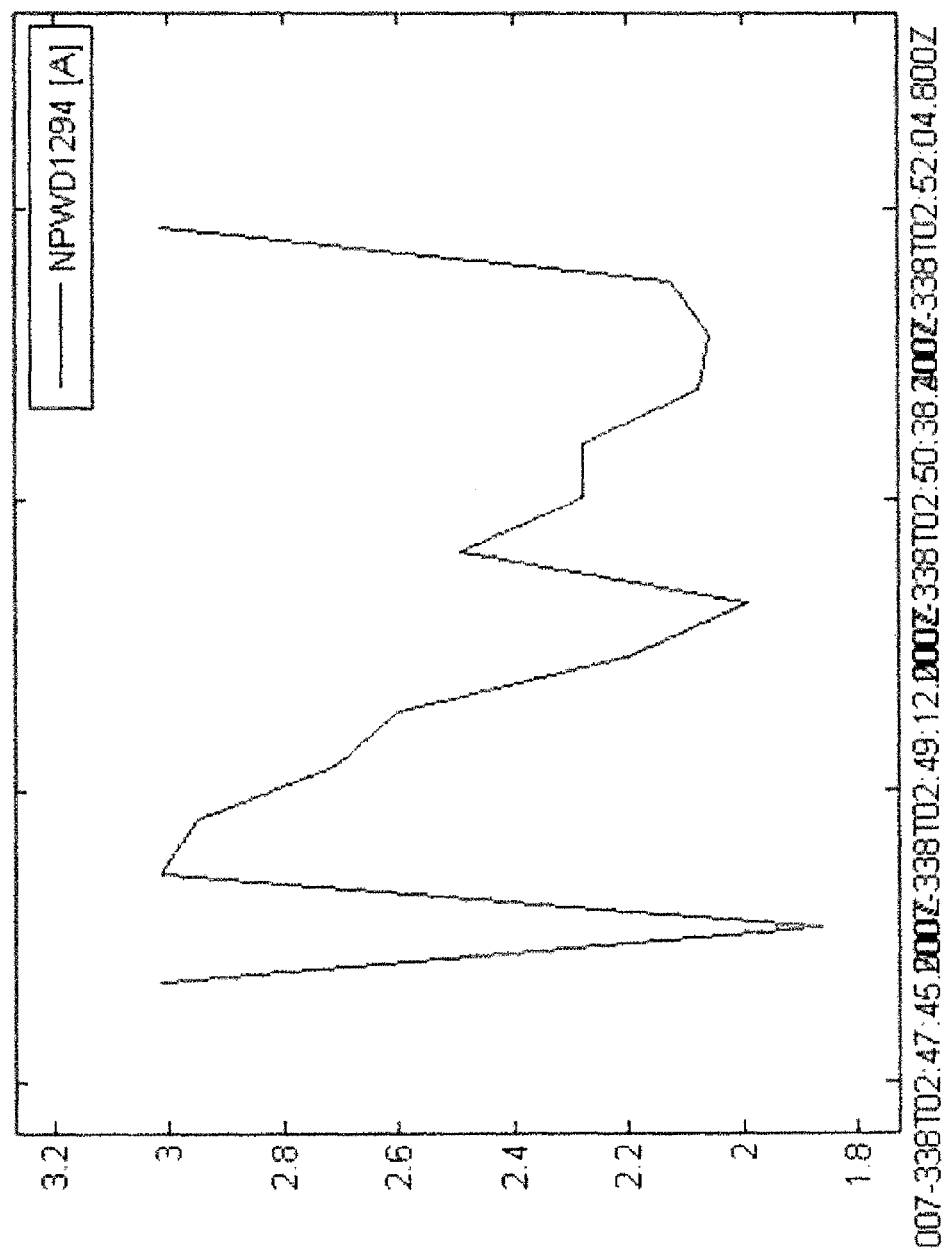

METHOD AND APPARATUS FOR ANALYZING TIME SERIES DATA

TECHNICAL FIELD OF THE INVENTION

The present invention relates to a method and an apparatus for analyzing time series data for a time series parameter relating at least to one aspect of operation and/or behaviour of a system over time, wherein the invention in particular relates to a method and an apparatus for determining which one or more time series parameters of a plurality of time series parameters relating to the operation and/or behaviour of a system over time are correlated with a first state and/or first condition of the system.

In particular, the present invention relates to a method and an apparatus for analyzing time series data for a plurality of time series parameters, particularly for determining which one or more time series parameters of the plurality of time series parameters relating to the operation and/or behaviour of the system are correlated with a first state and/or first condition of the system, e.g. for the purpose of anomaly investigations or operation characterization/period characterization/condition characterization, wherein the characteristic or behaviour of the plurality of time series parameters over time indicates, describes and/or is related to the operation and/or behaviour of the system.

For example, the present invention can be applied to e.g. time series data comprised in technical telemetry data relating to the operation of a technical system, e.g. one or more plants, in particular power plants, one or more vehicles, a space station, one or more space crafts such as satellites and/or space probes and/or satellite systems comprising additional base stations. The present invention can also be applied to e.g. time series data of one or more medical apparatuses possibly including time series data relating to medical condition parameters of a patient, or time series data relating to parameters of a financial system such as e.g. the stock market, or time series data relating to the operation of computer networks and/or communication networks, or time series data relating to the condition of a traffic network, or time series data relating to operation of a network of electric power supply network system, or any set of time series data parameters relating to the behaviour and/or operation of a system.

In general, the present invention can be applied to any system for which time series data is available and which shows a behaviour, operation or characteristics that allow to distinguish between at least two states or conditions of the system.

BACKGROUND OF THE INVENTION

According to the prior art, it is known to e.g. provide time series data for a plurality of time series parameters relating at least to one aspect of the operation of a system over time. Such time series parameters can for example relate to operational parameters which are affected by the operation of the system and/or affect the operation of the system. For example, the operation of space crafts such as satellites or space probes can be monitored by receiving telemetry data from the space craft, wherein the telemetry data comprises time series data regarding a plurality of various time serious parameters which are related to the operation of the space craft.

Time series data for a certain time series parameter describes the characteristics and behaviour of the particular time series parameter over time, wherein the time series is a sequence of data points reflecting the value of the time series parameter at different times, e.g. periodically. Generally, a large number of various parameters is affected by or affects the operation of a system such as for example a satellite, a system of satellites, or a space probe so that generally a large amount of data is comprised in the telemetry data received from the system, i.e. time series data relating to time series of a large number of time series parameters related to the operation of the system.

According to the prior art, telemetry data comprising time series data of a plurality of time series parameters relating to the operation of the system can be analyzed, for example for the purpose of anomaly investigations, system/subsystem characterizations, or period characterizations such as e.g. mission phase characterizations (e.g. for characterizing different periods of different mission phases of a space craft, wherein the space craft is in different modes of operation during the different mission phases).

For example, relating to the issue of anomaly investigations, when an anomaly occurs during the operation of the system, the telemetry data comprising the time series data relating to the time series of the plurality of time series parameters has to be analyzed in order to find out which of the plurality of time series parameters is correlated to the occurrence of the anomaly or correlated to the anomaly. Here, a particular time series parameter is correlated with the anomaly, if the occurrence of the anomaly affects the behaviour of the particular time series parameter and/or is affected by the behaviour of the particular time series parameter. For example, a time series parameter which is correlated to the anomaly shows a different behaviour when the anomaly occurs and may be for example related to the cause of the anomaly, an effect of the anomaly, a knock-on effect of the anomaly, or in rare cases be only coincidental with the anomaly.

Such an analysis of time series data for the purpose of anomaly investigation is particularly important for understanding characteristics of the anomaly and the occurrence of the anomaly, regarding the cause, the effect and/or possible knock-on effects, for example, in order to make it possible to avoid the occurrence of such an anomaly in the future or to at least minimize the effects of the anomaly.

According to the prior art, when a space craft such as a satellite or a space probe faces an anomaly, flight control engineers on the ground have to perform an analysis of the received telemetry data including the time series data for trying to find the causes and/or effects of the anomaly, wherein such an anomaly investigation generally consists of very labour-intensive data analysis tasks because it is required that the flight control engineers performing the anomaly investigation try to guess or hypothesize which of the plurality of time series parameters describing the operation of the space craft may have a correlation to the anomaly. Thereafter, the flight control engineers have to check, whether the guessed or hypothesized parameter is actually correlated to the anomaly or not, i.e. the flight control engineers perform an analysis based on time series data to prove or discard the guess or hypothesis that a particular time series parameter of the plurality of time series parameters is indeed correlated to the anomaly. However, such an analysis has the large disadvantages that it is very labour-intensive on one hand, and on the other hand, the flight control engineer might overlook some of the actual correlations, if the flight control engineers miss to guess some of the parameters of the plurality of time series parameters which are indeed correlated to the anomaly, because the flight control engineers can only consider potential correlations according to their knowledge and experience. However, since the operation of a system, e.g. a space probe such as a satellite or a space probe is affected by or affects a huge number of different time series parameters, correlations may be unexpected and, therefore, be easily overlooked by the flight control engineers performing the analysis for the purpose of anomaly investigations.

Furthermore, similar analysis of time series data can be performed for the purpose of period characterizations such as mission phase characterizations, i.e. characterizations of different nodes of operations during a mission of a space craft such as a space satellite or a space probe. Here, it is also important to find out which of the plurality of time series parameters are correlated to a specific mission phase or operation mode of the space craft i.e. which of the plurality of time series parameters is affected by or affects the specific operational mode in a specific mission phase of the space craft.

However, similar to the problems of the time series data analysis performed for the purpose of anomaly investigations as discussed above, such mission phase characterizations or period characterizations are also very labour-intensive and also require that a flight control engineer performs a guess or hypothesis which of the plurality of time series parameters is correlated with a specific operational mode or mission phase of the space craft.

In view of the above-mentioned problems of the prior art, it is an object of the present invention to provide a method and an apparatus for determining which one or more time series parameters of a plurality of time series parameters relating to the operation of a system are correlated with a first operation state of the system, such as for example an operation state in which an anomaly occurs or an operation state corresponding to a specific mission phase or operation mode of the system, wherein the required analysis of the time series data can be performed more efficiently compared to the method according to the prior art as described above, and wherein the determination of the parameters which are correlated with the first operation state can be performed in a more robust way, for example, by reducing the risk or probability of overlooking actually correlated parameters, and wherein the time series data analysis can be performed more systematically. Furthermore, it is an object of the present invention to provide a method and an apparatus for automatically, quickly, systematically and reliably finding parameter correlations regarding all of the house-keeping telemetry time series parameters describing the operation of the system.

SUMMARY OF THE INVENTION

To solve the above-mentioned problems of the prior art and to attain the above-described objects of the present invention, a method for determining which one or more time series parameters of a plurality of time series parameters relating to a system, in particular to the operation and/or behaviour of the system, are correlated with a first state and/or first condition of the system, an apparatus for determining which one or more time series parameters of a plurality of time series parameters are correlated with a first state and/or first condition of the system, and a computer program product according to the independent claims are proposed according to the present invention. The dependent claims relate to preferred embodiments, preferred aspects, and optional features of the present invention.

The present invention relates to a method and an apparatus for analyzing time series data for a time series parameter relating at least to one aspect of operation and/or behaviour of a system over time, wherein the invention in particular relates to a method and an apparatus for determining which one or more time series parameters of a plurality of time series parameters relating to the operation and/or behaviour of a system over time are correlated with a first state or condition of the system.

In particular, the present invention relates to a method and an apparatus for analyzing time series data for a plurality of time series parameters, particularly for determining which one or more time series parameters of the plurality of time series parameters relating to the operation or behaviour of the system are correlated with a first state or condition of the system, e.g. for the purpose of anomaly investigations or operation characterization/period characterization/condition characterization, wherein the characteristic or behaviour of the plurality of time series parameters over time indicates, describes and/or is related to the operation and/or behaviour of the system. For example, the present invention can be applied to e.g. time series data comprised in technical telemetry data relating to the operation of a technical system, e.g. one or more plants, one or more vehicles, a space station, one or more space crafts such as satellites and/or space probes and/or satellite systems comprising additional base stations. The present invention can also be applied to e.g. time series data of one or more medical apparatuses possibly including time series data relating to medical condition parameters of a patient, or time series data relating to parameters of a financial system, e.g. the stock market, or time series data relating to the operation of computer networks and/or communication networks, or time series data relating to the situation of a traffic network, or time series data relating to operation of a network of electric power supply network system, or any set of time series data parameters relating to the behaviour and/or operation of a system. In general, the present invention can be applied to any system for which time series data is available and which shows a behaviour, operation or characteristics that allow to distinguish between at least two states or conditions of the system.

According to the present invention, a method for determining which one or more time series parameters of a plurality of time series parameters relating to a system, in particular to the operation or behaviour of the system over time, are correlated with a first state and/or first condition of the system comprises:
providing time series data including data relating to a time series of each of the plurality of time series parameters;
determining at least two first time periods, wherein the system is in the first state and/or first condition during the at least two first time periods;
determining at least one second time period, wherein the system is in a second state and/or second condition during the at least one second time period;
determining, for each respective time series parameter of the plurality of time series parameters, a first characteristic parameter relating to a first characteristic of the time series of the respective time series parameter for each of the at least two first time periods and the at least one second time period; and/or
determining which one or more time series parameters of the plurality of time series parameters are correlated with the first state and/or first condition of the system by determining, for each respective time series parameter of the plurality of time series parameters, whether or not the respective time series parameter is correlated with the first state and/or first condition of the system based on the first characteristic parameters of the respective time series parameter determined for each of the at least two first time periods and the at least one second time period.

Accordingly, a method for determining which one or more time series parameters of the plurality of time series parameters are correlated with the first state and/or first condition of the system can be provided, wherein the time series parameters which are correlated can be determined efficiently, reliably and possibly automatically, wherein no guesswork by a human, such as e.g. by an engineer analyzing a technical system's operation and/or behaviour, is required so that the method is independent from the particular knowledge and experience of the human performing the analysis. In other words, according to the present invention, a method is provided which allows the automation of the determination (or finding) of the time series parameters which are correlated with the first state and/or first condition of the system.

In general, the present invention can be applied to any system for which time series data is available and which shows a behaviour, operation or characteristics that allow to distinguish between at least two states or conditions of the system.

The first state and/or condition of the system can be e.g. an anomaly in the operation of a system and/or could be involved in the occurrence of the anomaly, e.g. as a cause, an effect, or even a knock-on effect of the anomaly. Alternatively, the method according to the present invention also allows the automation of determining time series parameters which are correlated with e.g. a specific mission phase or operational mode of a technical system, which can be also performed more efficiently, more reliably, and possibly automatically, without the requirement of guesswork provided by the engineer, so that the method is independent of the particular knowledge and experience of the engineer performing the analysis.

Accordingly, the method according to the present invention further provides the advantage that the determination of correlated time series parameters can be performed in less time which might help to understand the operation and/or behaviour of the system during the first state and/or first condition more quickly, which may be especially advantageous for the purpose of anomaly investigations regarding the operation of a technical system. Here, the time saving can be achieved with respect to the prior art since a determination of the correlated time series parameters is performed systematically in only a fraction of the time that would be required when a human would have to guess the correlated parameters based on his knowledge or experience.

In particular, if the method is used for determining the time series parameters which are correlated with an anomaly for the purpose of anomaly investigations regarding the operation of a technical system, the method according to the present invention provides the possibility that the causes and effects of the first state and/or condition such as e.g. an anomaly can be better understood in a shorter fraction of time, which may be of great importance with respect to the object of preventing the anomaly from happening again by understanding the possible causes of the anomaly and the involved parameters, possibly also with respect to minimizing the effect of the anomaly.

Further, in case the method is used for the purpose of period characterization such as e.g. mission phase characterization or operational mode characterization for determining which time series parameters of the plurality of time series parameters is correlated with a specific mission phase or operational mode of the system, the analysis can be performed in shorter fraction of time compared to the method according to the prior art.

Since there are determined the at least two first time periods and the at least one second time period according to the method according to the present invention, it is possible to automatically and quickly determine those time series parameters of a very complex system comprising a huge number of various time series parameters which behave similarly during the at least two first time periods but differently during the at least one second time period. Further, increasing the number of determined first and second time periods further helps to increase the accuracy of the determination of the correlated time series parameters, and the number of time series parameters which are determined to be correlated with the first operation state are less probably only coincidental to the first operation state. Accordingly, the reliability of the method can be generally improved by increasing the number of first and second time periods. However, it should be noted that in the case of some anomalies, the reliability might also decrease again for a high number of first and second time periods since for a high number of different first and second time periods, some of the anomaly situations referred to by the first time periods are not in fact identical situations so the time series parameters that are reported (determined to be correlated) could be different i.e. it might be determined that the parameters are not correlated. This can be avoided in that the determination is repeated with a different number of first and second time periods or even with different first and/or second time periods.

A further advantage is that large time series data sets can be quickly and systematically analyzed, thereby saving time, avoiding errors and also finding correlations which are not normally considered in the engineering process, wherein large time series data sets can relate to either a large time series data set in terms of the number of time series parameters or also the time scale of the time periods or the time series, or both.

According to an aspect of the present invention, the respective time series parameter is preferably determined to be correlated with the first state and/or first condition of the system, if the first characteristic parameters of the respective time series parameter determined for the at least two first time periods are similar to each other but not similar to the first characteristic parameter of the respective time series parameter determined for the at least one second time period.

According to this aspect of the present invention, it can be efficiently and reliably determined that the respective time series parameter of the plurality of time series parameters is correlated with the first state and/or first condition of the system based on the assumptions that a respective time series parameter correlated (related) to the first state and/or first condition (e.g. an anomalous operation state or a specific operation state of the system) should have the same characteristics of behaviour in all of the at least two first time periods during which the system is in the first state and/or first condition. However, simultaneously, such a determination method is based on the second assumption that the time series parameters correlated (related) to the first state and/or first condition of the system should exhibit different characteristics and behaviour during the at least one second time period (e.g. a normal operation mode or a operation mode different from the specific operation mode).

According to an aspect of the present invention, the method preferably further comprises determining, for each respective time series parameter of the plurality of time series parameters, at least a second characteristic parameter relating to a second characteristic of the time series of the respective time series parameter for each of the at least two first time periods and the at least one second time period, wherein the respective time series parameter is preferably further determined to be correlated with the first state and/or first condition of the system, if the at least second characteristic parameters of the respective time series parameter determined for the at least two first time periods are similar to each other but not similar to the second characteristic parameter of the respective time series parameter determined for the at least one second time period.

Accordingly, the determination of the time series parameters which are correlated with the first state and/or first condition is based on at least two different characteristic parameters describing a different characteristic of the behaviour of the time series parameter during the determined first and second time periods. This has the advantage that the determination which of the time series parameters are correlated with the first state and/or first condition of the system is based on a plurality of characteristic parameters describing different characteristics, thereby increasing the reliability and efficiency of the determination.

In other words, determining a characteristic parameter of the respective time series parameter for the at least two first time periods and the at least one second time period is preferably performed for each of a plurality of types of characteristic parameters, wherein the respective time series parameter can be determined to be correlated with the first operation state of the system, if at least one characteristic parameter of the plurality of types of characteristic parameters is determined to be similar for the at least two first time periods but not similar for the at least one second time period.

According to an aspect of the present invention, the similarity of characteristic parameters of the respective time series parameter determined for the at least two first time periods and the at least one second time period is preferably determined based on a variation coefficient, wherein determined characteristic parameters of the respective time series parameter are preferably determined to be similar if the variation coefficient is smaller or equal to (or smaller to) a predetermined variation coefficient threshold value.

Generally, it is possible to determine the similarity of characteristic parameters of the respective time series parameters determined for the at least two first time periods and the at least one second time period based on the difference of the determined characteristic parameters, wherein the determined characteristic parameters could be determined to be similar if the difference is smaller or equal to a predetermined threshold value corresponding to the specific characteristic parameter (or type of characteristic parameter).

However, since different characteristic parameters describe different characteristics of the respective time series parameter during the first and second time periods, different threshold values would have to be set for different characteristic parameters. According to the above-mentioned aspect of the present invention, the similarity of characteristic parameters of the respective time series parameter determined for the at least two first time periods and the at least one second time period is preferably determined based on a variation coefficient (coefficient of variation), which is a statistical parameter normalized so as to take values between 0 and 1, so that a predetermined variation coefficient threshold value may be chosen to be the same for different characteristic parameters. This has the advantage that the method according to the present invention can be more systematically and more manageably performed, especially if the method is performed by using a plurality of different characteristic parameters for the determination of correlated time series parameters.

According to an aspect of the present invention, the first characteristic parameter is preferably a statistical or mathematical parameter such as for example an average value of the time series in the respective time period, standard deviation of the time series in the respective time period, variance of the time series in the respective time period, maximum value of the time series in the respective time period, minimum value of the time series in the respective time period, time series parameter range in the respective time period, slope of the time series in the respective time period, maximum minus slope of the time series in the respective time period, minimum minus slope of the time series in the respective time period, maximum plus slope of the time series in the respective time period, minimum plus slope of the time series in the respective time period, skewness of the time series in the respective time period or kurtosis of the time series in the respective time period, or the like. Preferably also the at least second characteristic parameter is a statistical or mathematical parameter from the above list different from the first characteristic parameter.

This has the advantage that known statistical or mathematical parameters can be used for describing the characteristic of behaviour of a respective time series parameter during the first and second time periods, which can be reliably compared for the different first and second time periods for the respective time series parameter.

According to an aspect of the present invention, the method preferably further comprises outputting correlation information data which indicates which of the plurality of time series parameters are determined to be correlated with the first state and/or first condition of the system.

According to this aspect of the present invention, the correlation information data which indicates the time series parameters determined to be correlated with the first state and/or first condition of the system can be outputted and easily used for further analysis tasks and/or be provided to an engineer.

According to an aspect of the present invention, the correlation information data preferably further indicates which one or more characteristic parameters of the respective time series parameter are determined to be similar to each other for the at least two first time periods but not similar for the at least one second time period.

This has the advantage that the behaviour of a respective time series parameter and the type of correlation of the respective time series parameter with the first state and/or first condition of the system can be more properly understood since it is included in the outputted correlation information data which one or more of the different characteristic parameters indicate the correlation and which characteristic parameter is unaffected or less affected from the correlation with the first state and/or first condition.

According to an aspect of the present invention, the method for determining which one or more time series parameters of a plurality of time series parameters relating to operation of the system are correlated with the first state and/or first condition of the system is preferably used for the purpose of anomaly investigations, wherein the first state and/or first condition of the system preferably relates to an anomalous operation mode and an anomaly occurs during each of the at least two first time periods, and the second state and/or second condition of the system preferably relates to a normal operation mode and the anomaly does not occur during the at least one second time period.

According to this aspect of the present invention, the method for determining correlated time series parameters is used for the purpose of anomaly investigations, which means that it is to be determined which time series parameters of the plurality of time series parameters are correlated to the anomaly e.g. with the occurrence of the anomaly, i.e. which of time series parameters are affected by or affect the anomaly, e.g. as cause, effect, or knock-on effect of the occurrence of the anomaly. Reliably and efficiently determining the time series parameters of the plurality of time series parameters which are correlated with the occurrence of the anomaly may help to understand the occurrence of the anomaly and try to avoid the occurrence of such an anomaly in the future or at least minimize the effect of an anomaly.

According to an aspect of the present invention, as an alternative to the use for the purpose of anomaly investigations, the method for determining which one or more time series parameters of the plurality of time series parameters relating to operation of the system are correlated with the first operation state of the system is preferably used for the purpose of period characterizations, wherein the first state and/or first condition of the system during the at least two first time periods is preferably a first normal operation mode and the second state and/or second condition of the system during the at least one second time period is preferably a second normal operation mode preferably different from the first normal operation mode.

This means that the method according to the present invention can also be used for the purpose of period characterizations such as mission phase characterizations, operational phase characterizations or the like, where there is no occurrence of an anomaly but it has to be determined which of the plurality of time series parameters are correlated with a specific second operation mode which is different from the first operation mode, such as for example a general common normal operation mode. An examples for such period characterizations could be the comparison of different mission phases of a space craft such as a satellite or a space probe in two different operation states, e.g. a first operation state in which for example a solar array of a space probe operates at the maximum power (e.g. being fully illuminated by solar light) and a second operation state of the system wherein the solar array does not operate at maximum power, e.g. when it is put in the shadow and is not illuminated at all. Such operation states are not related to an anomalous operation mode in which an anomaly occurs but still show different behaviour for different time series parameters and it can be important to determine parameters of the plurality of time series parameters which are correlated with the first operation state of the system, i.e. which behave differently in the first operation state of the system compared to the second operation state of the system, i.e. the time series parameters which show a behaviour or characteristic which is affected by or affects the first operation state of the system.

According to an aspect of the present invention, determining at least two first time periods preferably comprises setting a first of the at least two first target time periods and/or determining at least a second of the at least two first target time periods based on a shape of the time series for at least one of the plurality of time series parameters in the first of the at least two first time periods, wherein the second of the at least two first time periods is preferably determined such that a shape of the time series for the at least one of the plurality of time series parameters in the second of the at least two first time periods is similar to the shape of the time series for the at least one of the plurality of time series parameters in the first of the at least two first target time periods.

According to this aspect of the present invention, at least one of the two first time periods is set for example by an engineer (e.g. as a time period covering an anomalous operation mode of the system or a specific operation mode for period characterization of the operation of the system). Accordingly, an engineer can set one of the first time periods according to the requirements of the time series data analysis, wherein this aspect of the present invention further allows to determine further first time periods based on the shape of the time series of at least one of the time series parameters during the set first time period.

This allows to determine further first time periods based on the set first time period by determining further time periods in which the system is in the first operation state based on comparison of shapes of time series so that a further first time period can be determined if it is determined that this determined further first time period provides a similar shape for a time series of at least one time series parameter compared to the shape of the same time series parameter during the set first time period. This may be especially advantageous for the purpose of anomaly investigation when further time periods, e.g. time periods in the past covered by history telemetry data have to be determined based on the occurrence of one detected anomaly wherein the set first time period is set around the time of the occurrence of the detected anomaly and the telemetry history time series data is scanned for further occurrences of the anomaly or a similar anomaly which may not have been previously detected.

This aspect of the present invention may also be used for the purpose of early warning of the occurrence of an anomaly if the set first time period is set around the time of the occurrence of an anomaly/specific state/specific condition in the past and real-time time series data describing the real-time operation or real-time behaviour of the system is scanned for the occurrence of an anomaly/specific state/specific condition based on the shape of the time series of the time series parameters during the first time period which has been set in the past time series data.

According to an aspect of the present invention, also determining at least one second time period preferably comprises setting at least one second time period. According to this aspect of the present invention, also the second time period may be set, for example by a human such as e.g. an engineer.

According to an aspect of the present invention, the similarity of the shapes of the time series for the at least one of the plurality of time series parameters in the first and second of the at least two first time periods is preferably determined based on one or more dynamic time warping distances. Preferably, the determination of the similarity of the shapes of the time series for the at least one of the plurality of time series parameters in the first and second of the at least two first time periods is based on a ranking of the lowest dynamic time warping distances of the shapes of the time series for the at least one of the plurality of time series parameters in the first and second of the at least two first time periods. From the preferably similar time periods returned, the time periods determining a shape of interest and thereby selected as a first time period can be set for example by an engineer. Here, it may be the case that a sampling rate in the considered first time periods is not similar and the time series data of the different considered first time periods does not match for a comparison based on the returned dynamic time warping distances. In this case, the method may preferably further comprise a step of re-sampling the time series data covered by the at least two first time periods e.g. if the sampling rate in the different first time periods is different so that after re-sampling, the re-sampled data is suitable for the similarity analysis based on the dynamic time warping distances. Here, the step of re-sampling may further comprise performing an interpolation of time series data, reducing the number of data points in the time series data or the like.

According to this aspect of the present invention, a similarity of shapes of the time series for at least one of the plurality of time series parameters in the different time periods, for example for determining a second of the at least two first time periods as described above, can be determined based on the known technique of computing dynamic time warping distances, wherein the similarity determination is based on the best results from a ranked matching of dynamic time warping distances. Such dynamic time warping techniques are known from the technology of speech recognition and have recently been applied to time series pattern matching (for example for finding similar shapes in the behaviour of time series of time series parameters).

According to an aspect of the present invention, the method for determining which one or more time series parameters of a plurality of time series parameters relating to operation of the system are correlated with the first operation state of the system is preferably used for the purpose of anomaly investigations, wherein the first operation state of the system preferably relates to an anomalous operation mode and an anomaly occurs during one of the two first time periods, and the second operation state of the system preferably relates to a normal operation mode and the anomaly does not occur during the at least one second time period, and wherein the method further preferably comprises detecting the occurrence of an anomaly in real-time time series data relating to a current operation of the system, wherein the occurrence of the anomaly is preferably detected in the real-time time series data, if the shape of the time series for the at least one of the plurality of time series parameters included in the real-time series data is determined to be similar to the shape of the time series for the at least one of the plurality of time series parameters in the one of the at least two first time periods.

According to this aspect of the present invention, the determination of a further first time period can be used for providing an early warning of the occurrence of an anomaly if the determination of the first time period is based on real-time time series data describing the real-time operation of the system when the real-time time series data is compared to time series data of the past, in particular, based on the shape of a time series of at least one of the time series parameters correlated with the anomaly during a set first of the at least two first time periods.

According to an aspect of the present invention, the system is preferably a vehicle, a space craft, a space shuttle, a space station, a satellite, a system of a plurality of satellites, a space probe, a system of a plurality of space probes, a plane, an aircraft, or a device relating to robotics, or at least part thereof.

Furthermore, according to the present invention, an apparatus for determining which one or more time series parameters of a plurality of time series parameters relating to the operation a system are correlated with a first operation state of the system is provided, which is configured to perform a time series data analysis according to a method for determining correlated time series parameters according to at least one of the above described aspects.

A summary of an apparatus according to the present invention is given below, wherein it has to be noted that additionally, the means of the apparatus are configured to perform features and aspects of the method according to the above described aspects which are not all described in detail below for sake of conciseness of the present description. Features, aspects, and advantages of the above-mentioned aspects of the method according to the present invention, also apply to the below described apparatus according to the present invention and are not repeated for sake of conciseness of the present description.

According to the present invention, an apparatus for determining which one or more time series parameters of a plurality of time series parameters relating to operation and/or behaviour of a system are correlated with a first state and/or first condition of the system comprises:

a time series data providing means for providing time series data including data relating to a time series of each of the plurality of time series parameters;

a time period determining means comprising:

a first time period determining means for determining at least two first time periods, wherein the system is in the first state and/or first system during the at least two first time periods; and a second time period determining means for determining at least one second time period, wherein the system is in a second state and/or second condition during the at least one second time period;

a characteristic parameter determining means for determining, for each respective time series parameter of the plurality of time series parameters, a first characteristic parameter relating to a first characteristic of the time series of the respective time series parameter for each of the at least two first time periods and the at least one second time period; and/or a correlation determining means for determining which one or more time series parameters of the plurality of time series parameters relating to the operation and/or behaviour of the system are correlated with the first state and/or first condition of the system by determining, for each respective time series parameter of the plurality of time series parameters, whether or not the respective time series parameter is correlated with the first state and/or first condition of the system based on the first characteristic parameters of the respective time series parameter determined for each of the at least two first time periods and the at least one second time period.

According to an aspect of the present invention, the time period determining means preferably further comprises a time period setting means for setting at least one of the two first time periods and the at least one second time period.

According to the present invention, a computer program product comprising a non-transitory computer-readable medium and a computer software program stored therein, wherein the computer software program is stored in a sequence of states corresponding to a sequence of commands, which are configured to be executed by a data processing means of a data processing apparatus such that an apparatus according to claim 12 or 13 is provided. Furthermore, the non-transitory computer-readable medium includes all computer-readable media, with the sole exception of being a transitory, propagating signal.

Features, components and specific details of the above-described aspects of the present invention may be exchanged or combined to form further aspects optimized for the respective application. As far as those modifications are readily apparent for an expert skilled in the art, they shall be implicitly disclosed by the above description without specifying explicitly every possible combination, for the sake of conciseness of the present description. Furthermore, it is to be noted that steps of the method and means of the apparatus as described above may be realized by hardware, software, or combinations thereof.

The above-described aspects and features, and advantages thereof, will become more apparent from the detailed description of preferred embodiments, which will be described with reference to the accompanying figures below.

BRIEF DESCRIPTION OF THE FIGURES

FIGS. 4A, 4B, and 4C illustrate the time series behaviour of a first time series parameter during a first, a second, and a third first time period.

FIGS. 5A, 5B, and 5C illustrate the time series behaviour of a second time series parameter during a first, a second, and a third first time period.

FIGS. 6A, 6B, and 6C illustrate the time series behaviour of a third time series parameter during a first, a second, and a third first time period.

DETAILED DESCRIPTION OF THE FIGURES AND PREFERRED

Embodiments of the Present Invention

Figure 1:
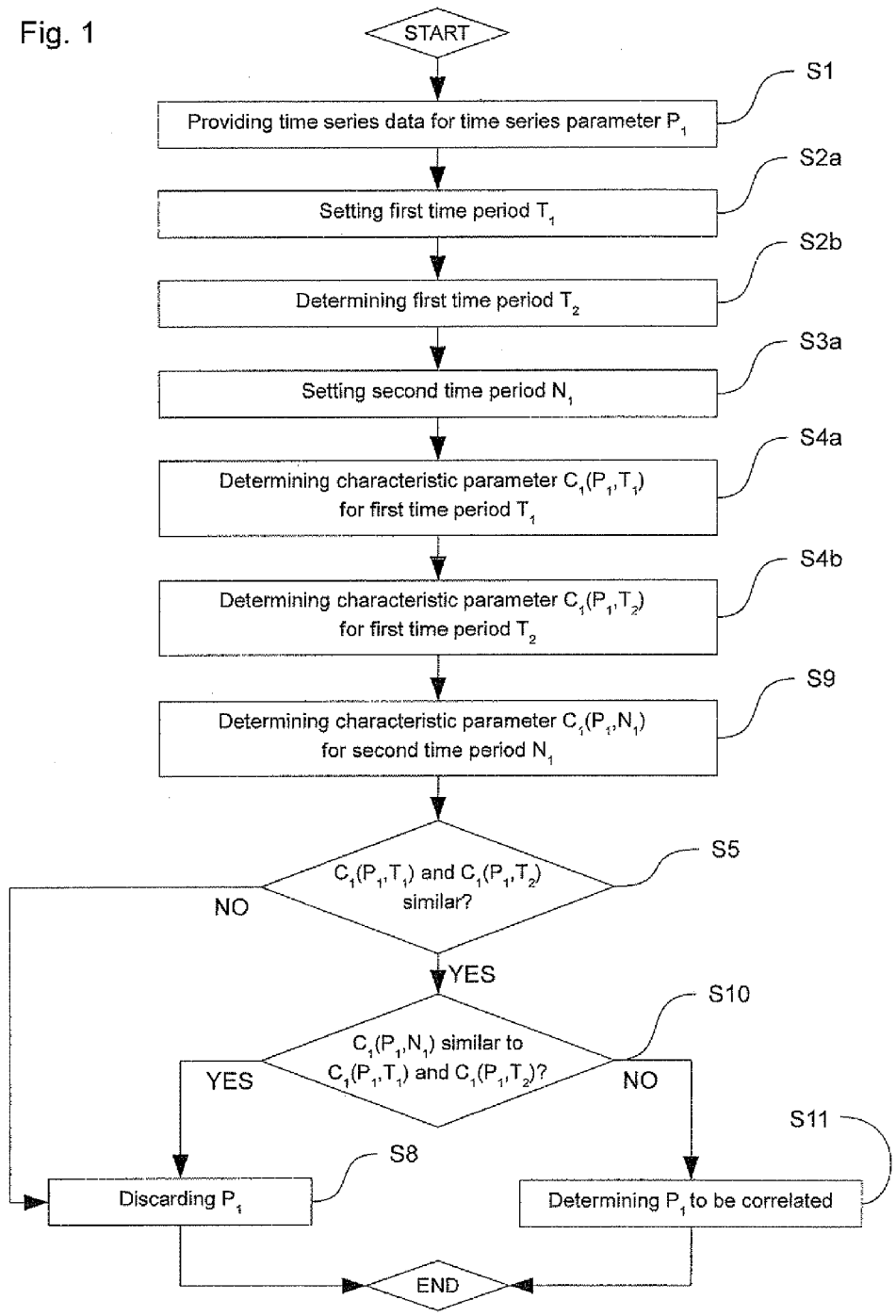
FIG. 1 shows a flow chart of a method for determining if a time series parameter relating to at least one aspect of an operation of a system is correlated with a first operation state of the system according to an embodiment of the present invention.

Preferred embodiments of the present invention will be described in the following with reference to the accompanying figures. It is to be noted that the present invention is not limited to the described embodiments and the described features and aspects of the embodiments may be modified or combined to form further embodiments of the present invention.

It is to be noted that the present invention will be described with respect to the use for the purpose of anomaly investigations in the following description of preferred embodiments relating to the application of the invention to the technical operation of a technical system, wherein a first operation state of the system refers to an operation state of the system in which an anomaly occurs, i.e. an anomalous operation mode, wherein a second operation state of the system refers to a normal operation mode of the system, wherein no anomaly occurs during the normal operation mode of the system.

However, the present invention is not limited to the use for the purpose of anomaly investigations and can, for example, also be used for the purpose of period characterization such as the characterization of the behaviour of time series parameters over different mission phases, instrument modes, pointing modes, or the like. As an example for such a period characterization, an example of the present invention will be described with reference to an example relating to period characterization of different mission phases of a space probe (cf. FIGS. 4A to 6F and the description thereof).

The present invention is described in the following with respect to technical systems for which telemetry data including time series data for a plurality of time series parameters being related to the operation of the technical system can be provided or are available, such as for technical systems like vehicles, a system of vehicles, plants such as e.g. power plants or a system of power plants, space crafts, satellites, a system of satellites, space probes, a system of space probes, space shuttles, a space station, a ground segment of space applications, or the like. It can be applied to systems of networks such as e.g. traffic networks, computer networks, communication networks, power supply networks etc.

It should be noted that the present invention may be generally applied to systems for which time series data such as e.g. telemetry data as discussed above is available and may be further applied for example to a power supply system (with the occurrence of anomalies such as e.g. power outages), a road network for which traffic data is available (with the occurrence of anomalies such as e.g. traffic jams), a financial system such as e.g. the stock market, or even medical applications such as e.g. parameters relating to the medical condition of a patient, as long as time series data for a plurality of time series parameters describing the system or the behaviour of the system over time is available or can be provided.

In general, the present invention can be applied to any system for which time series data is available and which shows a behaviour, operation or characteristics that allow to distinguish between at least two states or conditions of the system.

FIG. 1 shows a flow chart of a method for determining which one or more time series parameters of a plurality of time series parameters relating to operation of the system are correlated with a first operation state of the system such as an anomalous operation state of the system, wherein an anomaly occurs during the anomalous operation state of the system according to an embodiment of the present invention. Here, aspects, features, and method steps of the method according to the present invention are described with respect to the determination if a first time series parameter P1 is correlated with the anomalous operation state of the system, i.e. with an anomaly that occurs during the anomalous operation state of the system according to this embodiment. Furthermore, according to this embodiment, it is determined based on one first characteristic parameter C1, whether the first time series parameter P1 is correlated with the anomaly or not.

In FIG. 1, it is shown that in a first step S1 of providing time series data for the time series parameter P1 is carried out for providing a time series data including data relating to the time series of the time series parameter P1 which relates to at least one aspect of the operation of the system. Here, the time series data includes at least data about the time series which is a sequence of parameter values of the parameter P1 at different times for a certain period of time, i.e. periodically. Such time series data can be for example provided from a storage means in which time series data for the time series parameter P1 is stored (for example stored history telemetry data including the time series data for time series parameter P1 or real-time time series data for the time series parameter P1 received at real-time from the system, wherein real-time time series data relates to the current real-time operation of the system).

In the next step S2a of setting the first time period T1, the first time period T1 is set such that it covers a time period which corresponds to an anomalous operation state of the system so that an anomaly has occurred or occurs during the first time period T1. Thereafter, in step S2b of determining the first time period T2, the first time period T2 is determined, wherein the first time period T2 is a time period different from the first time period T1, however, wherein also in the first time period T2, the system is in the anomalous operation state and the anomaly has occurred or occurs also during the first time period T2. Here, determining the first time period T2 can be either carried out analogous to step S2a in that also the first time period T2 is set such that the anomaly occurs during the first time period T2, however, as an alternative thereto, the first time period T2 can be determined based on the shape of the time series of the time series parameter P1 during the first time period T1 which has been set in step S2a (in case the time series parameter P1 is correlated to the anomaly), wherein the first time period T2 is determined such that the shape of the time series of the time series parameter P1 during the first time period T2 is similar to the shape of the time series for the time series parameter P1 during the first time period T1 (i.e. similar to the shape corresponding to the correlation of the time series parameter P1 to the occurrence of the anomaly).

Such similarity determinations of the shapes of the time series for the time series parameter P1 during the first time periods T1 and T2 can be performed based on the determination of the dynamic time warping distance as is, for example, described in the article Keogh E., "Exact indexing of dynamic time warping" (2002), Proceedings of the 28th International Conference on Very Large Data Bases 2002, Hong Kong, pages 406 to 417, and as also applied in the technology of speech recognition (cf. e.g. Itakura F., "Minimum prediction residual principle applied to speech recognition" (1975), IEEE Trans Acoustics Speech Signal Process ASSP 23: 52-72, 1975 or Sakoe H, et al., "Dynamic programming algorithm optimization for spoken word recognition" (1978), IEEE Trans Acoustics Speech Signal Process ASSP 26: 43-49, 1978).

It is to be noted that it may occur that no further first time period beyond the set first time period can be identified in such a similarity determination. Still, the method according to the present invention requires two first time periods T1 and T2 in order to be able perform a comparison. In case no further first time period can be identified, a first time period in which the system is in the first operation state such as e.g. an anomalous operation state may also be split in two different first time periods to be able to perform the comparison. Then, the steps of determining the first time periods can further comprise splitting a first time period into at least two first time periods.

In the next step S3a of setting the second time period N1, the second time period N1 is set such that the anomaly does not occur during the second time period N1, i.e. such that the operation state of the system during the second time period N1 does not correspond to an anomalous operation state the system. For example, the second time period N1 can be set such that the operation state of the system during the second time period N1 corresponds to a normal operation mode in which the behaviour of the system is normal and no anomaly does occurs.

Further, in the step S4a of determining the characteristic parameter C1(P1,T1) for the first time period T1, a characteristic parameter C1 is determined for the first time series parameter P1 for the time series covered by the first time period T1, i.e. for the time series data lying within the first time period T1. The characteristic parameter C1 is a statistical or mathematical parameter for describing a characteristic of the behaviour of the time series of the time series parameter P1 during a certain time period such as, for example, the mean value, the standard deviation, the maximum value, the minimum value, the parameter range (maximum value minus minimum value), the slope, the maximum minus slope, the minimum minus slope, the maximum plus slope, the minimum plus slope, the skewness, the kurtosis, or the like.

Then, in step S4b of determining the characteristic parameter C1(P1,T2) for the first time period T2, the same characteristic parameter C1 (one of the parameters of the above list) is determined for the time series of the first time series parameter P1 covered by the first time period T2, i.e. analogous to the step S4a, but for the different first time period T2.

In the next step S9 of determining the characteristic parameter C1(P1,N1) for the second time period N1, the similar determination of the same characteristic parameter C1 is additionally performed for the time series of the first time series parameter P1 covered by the second time period N1.

It is to be noted that in the method according to the present invention, when used for the purpose of anomaly investigations, it is assumed that the first time series parameter P1 should behave similarly in all the first time periods in which the anomaly occurs, if the first time series parameter P1 is correlated to the anomaly (first assumption). Further, it is assumed that the first time series parameter P1, if it is correlated to the anomaly, should behave differently during the first time period in which the anomaly occurs and the second time periods in which the anomaly does not occur (second assumption). Summarizing, it can be determined that the first time series parameter P1 is correlated with the anomaly if the determined characteristic parameters C1(P1,T1) for the first time period T1 and the characteristic parameter C1(P1,T2) for the first time period T2 are similar to each other but different to the determined characteristic parameter C1(P1, N1) for the second time period N1 based on the two above assumptions.

Referring to FIG. 1 again, in step S5, it is determined whether the determined characteristic parameters C1(P1,T1) for the first time period T1 and the determined characteristic parameter C1(P1,T2) for the first time period T2 are similar or not (relating to the first assumption). Here, the similarity of the two determined characteristic parameters can be performed by computing the difference of the two characteristic parameters in the different first time periods based on a threshold value or, alternatively, the similarity can be determined based on a computation of the variation coefficient, wherein it is determined that the determined characteristic parameter values are similar to each other, if the corresponding variation coefficient is smaller or equal to a predetermined variation coefficient threshold value.

If it is determined that the two determined characteristic parameter values C1(P1,T1) and C1(P1,T2) are not similar to each other so that already the first of the above assumptions is not confirmed for the first time series parameter P1, the first time series parameter P1 is discarded in the next step S8 of discarding the time series parameter P1, because it is determined that the first time series parameter P1 is not correlated to the anomaly, since already the first assumption could not be confirmed.

However, if it is determined that the two characteristic parameter values C1(P1,T1) and C1(P1,T2) are indeed similar to each other (e.g. if the difference of the two characteristic parameter values is below a predetermined threshold value or the variation coefficient is below a predetermined variation coefficient threshold value), the method continues with step S10 in which it is checked, whether the characteristic parameter value C1(P1,N1) determined for the second time period N1 is similar to the determined characteristic parameter values C1(P1,T1) and C1(P1,T2) determined for the first time periods T1 and T2. If it is determined that the characteristic parameter C1(P1,N1) for the second time period N11 is similar to the determined characteristic parameters C1(P1,T1) and C1(P1,T2) for the first time periods T1 and T2, the method also continues with step S8 of discarding the time series parameter P1, since the first time series parameter P1 is determined to be not correlated with the anomaly, because the second of the above assumptions is not confirmed for the first time series parameter P1.

However, if it is determined in step S10 that the characteristic parameter value C1(P1,N1) determined for the second time period N1 is not similar to the characteristic parameter values C1(P1,T1) and C1(P1,T2) determined for the first time periods T1 and T2, it is confirmed that the first time series parameter P1 fulfils the conditions of both of the above-mentioned two assumptions, and, accordingly, it is determined in step S11 of determining P1 to be correlated that the first time series parameter P1 is correlated with the anomaly.

Here, the step S10 is for example performed in that the characteristic parameter value C1(P1,N1) determined for the second time period N1 is respectively compared to each of the characteristic parameter values C1(P1,T1) and C1(P1,T2) determined for the first time periods T1 and T2, wherein the similarity determination can be carried out analogously to the similarity determination of step S5 as described above. However, for embodiments of the present invention, in which the method according to the present invention is performed for a plurality of different characteristic parameters and a plurality of first and second time periods, it would amount to a huge number of combinations which have to be compared. Such huge number of different parameter combinations which have to be checked can be efficiently reduced by firstly computing or determining a mean value of the characteristic parameter values determined for the plurality of first time periods, e.g. in this case the mean value of the two characteristic parameter values C1(P1,T1) and C1(P1,T2) determined for the first time periods T1 and T2 such that the determined characteristic parameter value C1(P1,N1) determined for the second time period N1 only has to be compared to one parameter, i.e. the above-mentioned mean value of the characteristic parameter values determined for the plurality of first time periods.

As explained above, similar behaviours of the first time series parameter in first time periods corresponding to an anomalous operation state of the system, wherein an anomaly occurs during the first time periods, are characterized by similar characteristic parameter values in the different first time periods. It should be noted that the use of a determination of similar shapes of time series during the different first time periods can not be applied for searching or determining time series parameters which are correlated with the first operation state of the system, such as an anomalous operation mode of the system, across large data sets. The reason is that anomalous and nominal behaviour of a time series parameter can manifest itself in various different possible shapes for related time series parameters, which means that parameters that are related to each other in an anomaly will not always exhibit the same or similar shape but can exhibit some non-nominal characteristic.

For the above described embodiment as illustrated with reference to FIG. 1, the method according to the present invention is explained according to an embodiment with respect to one first time series parameter P1, two first time periods T1 and T2, and one second time period N1 based on a similarity determination of a first characteristic parameter C1. In general, time series data relating to the operation of a system will comprise data relating to a plurality of time series parameters Pj (P1, P2, P3, . . . ). Furthermore, for reducing the probability that a time series parameter Pj is erroneously determined to be correlated with an anomaly, although the determined correlation is actually only coincidental, the accuracy of the method according to the present invention can be further increased by increasing the number of first time periods Tk (T1, T2, T3, . . . ), and/or increasing the number of second time periods Nm (N1, N2, N3, . . . ). Also, since a correlation of a time series parameter Pj can manifest itself in various characteristics of the time series, the reliability of the method can be improved by performing the method for a plurality of different characteristic parameters Ci (C1, C2, C3, . . . ), which can be taken from the above-mentioned list as discussed for the first characteristic parameter C1.

Figure 2:
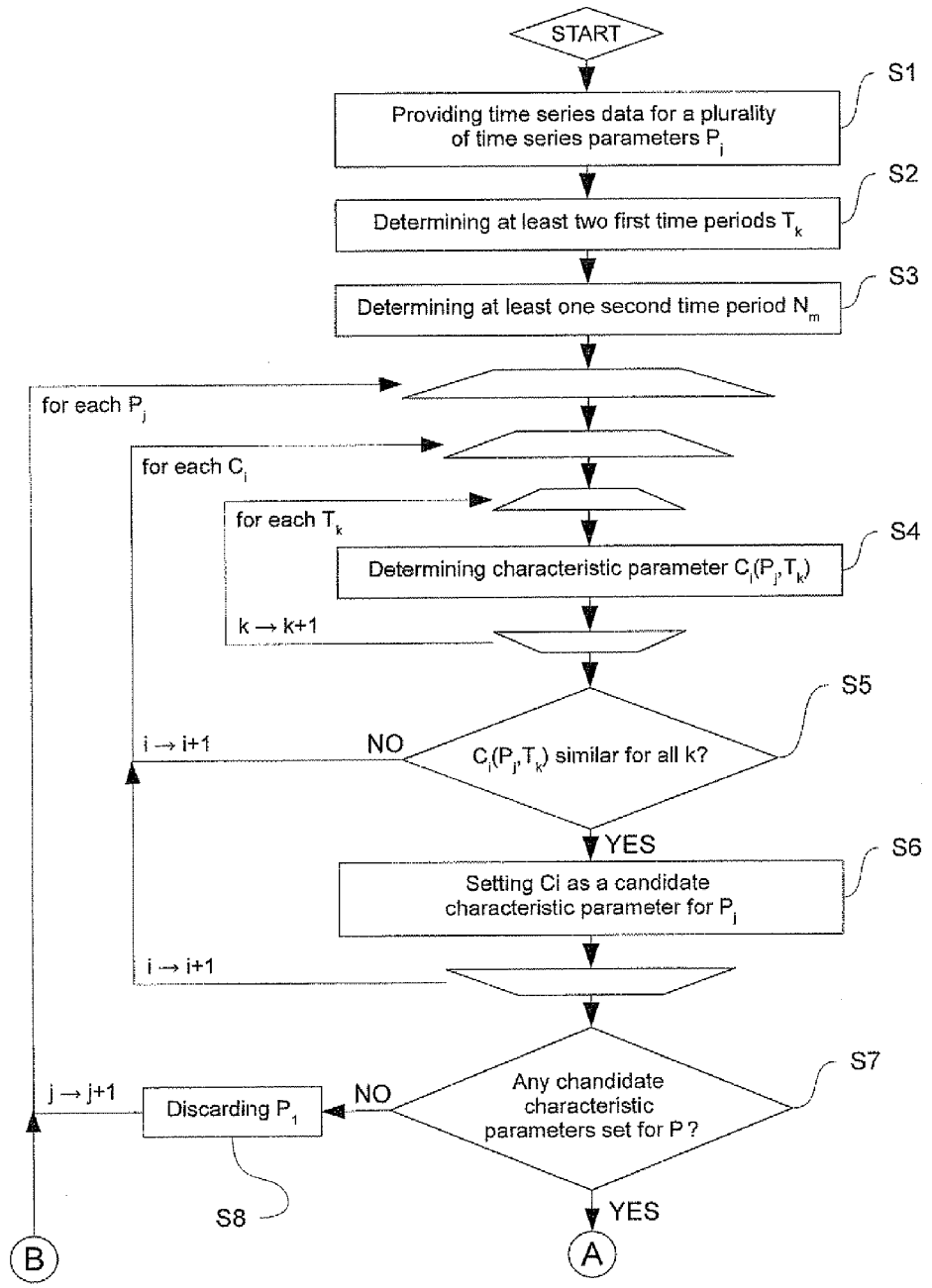
FIG. 2 shows a flow chart of a method for determining which one or more time series parameters of a plurality of time series parameters are correlated with a first operation state of a system according to an embodiment of the present invention.
Figure 2:
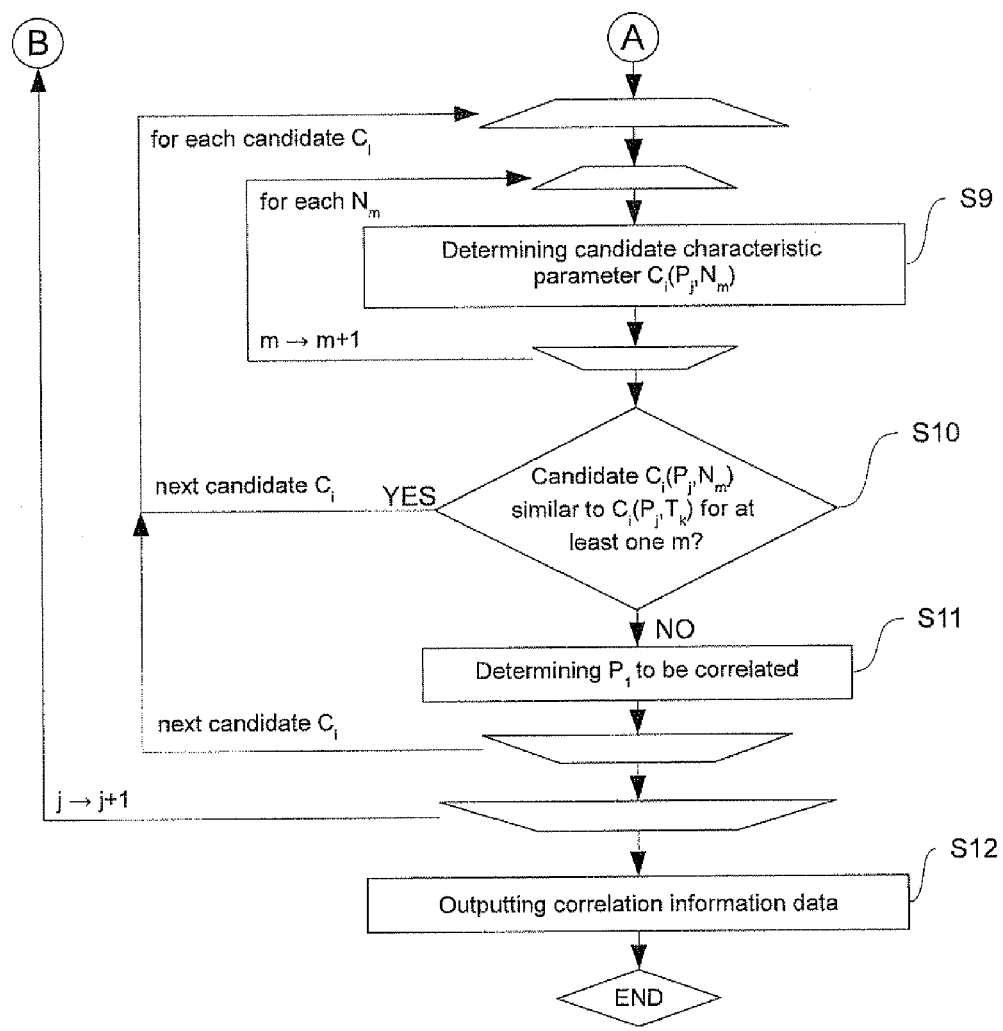

For example, in FIG. 2, a flow chart of a method for determining which one or more time series parameters of a plurality of time series parameters Pj relating to the operation of the system are correlated with an anomalous operation state of the system in which an anomaly occurs according to an embodiment of the present invention is described, wherein the method is more generally described for a plurality of first time periods Tk, at least one second time period Nm, and a plurality of different characteristic parameters Ci.

The method is illustrated with the flow chart of FIG. 2 and comprises the step S1 of providing time series data for a plurality of time series parameters Pj in which time series data is provided analogous to step S1 of FIG. 1, however, for a plurality of time series parameters Pj, i.e. including data relating to time series of a plurality of time series parameters Pj. Furthermore, in step S2 of determining at least two first time periods Tk, at least two first time periods Tk are determined analogously to the determination of the first time periods T1 and/or T2 in the above described steps S2a and/or S2b. In FIG. 2, in the step S3 of determining at least one second time period Nm, at least one second time period Nm is determined, possibly analogous to the above step S3a of the method as illustrated with reference to FIG. 1, wherein the at least one second time period Nm is determined such that the operation state of the system is corresponding to a normal operation mode during the at least one second time period Nm.

Further, according to this embodiment, the at least two first time periods Tk are determined such that the operation state of the system during the at least two first time periods Tk is an anomalous operation state of the system such that the anomaly occurs in each of the at least two first time periods Tk. Of course, also this embodiment is not limited to this use with respect to the purpose of anomaly investigation but can also be applied to period characterizations as mentioned above.

Next, as illustrated in FIG. 2, the method continues to a loop in which the following steps are performed for each of the plurality of time series parameters Pj. Furthermore, the method continues with a loop in which the following steps are performed for each of the plurality of characteristic parameters Ci. Further, the method continues with a loop in which the following step S4 is performed for each of the determined at least two first time periods Tk.

In step S4 of determining the characteristic parameter Ci(Pj,Tk) is determined in the loop for each of the at least two first time periods Tk such that for each of the first time periods Tk a characteristic parameter Ci is determined for the respective time series parameter Pj.

After the characteristic parameter values Ci(Pj,Tk) have been determined, i.e. the particular characteristic parameter Ci has been determined for the particular respective time series parameter Pj, but for each of the at least two first time periods Tk, i.e. for each k, the loop for each Tk is ended and the method continues with step S5 in which it is checked whether the determined characteristic parameter values Ci(Pj,Tk) are similar for all k, i.e. for all of the at least two first time periods Tk. If this is not the case, the method continues within the loop for each characteristic parameter Ci with the next of the plurality of characteristic parameters Ci. However, in the affirmative, i.e. in case it is determined that the determined characteristic parameter values Ci(Pj,Tk) are similar for all k, the method continues with step S6 of setting the characteristic parameter Ci as a candidate characteristic parameter for the particular time series parameter Pj and then continues within the loop for each characteristic parameter Ci for the next characteristic parameter Ci.

It is to be noted that in an alternative embodiment, the method could already continue as soon as at least one candidate characteristic parameter Ci is set in order to check for this candidate characteristic parameter if also the second assumption can be confirmed for this particular characteristic parameter Ci which has been determined as a candidate characteristic parameter. However, according to the embodiment of FIG. 2, all of the plurality of characteristic parameters Ci are checked for being candidate characteristic parameters.

Thereafter, the method leaves the loop for each of the characteristic parameters Ci and continues with step S7, in which is determined if any of the characteristic parameters Ci has been set as a candidate characteristic parameter for the parameter Pj in step S6, i.e. if at least one of the characteristic parameters Ci has been set as a candidate characteristic parameter for the parameter Pj in step S6. If no candidate characteristic parameter Ci has been set in step S6 for the time series parameter Pj, the method continues with step S8 of discarding the time series parameter Pj, since it could be determined that the particular time series parameter Pj is not correlated to the first operation state of the system, since the first of the above-mentioned two assumptions is not confirmed. Thereafter, the loop for each of the plurality of the time series parameters Pj is continued for the next time series parameter Pj.

However, if it can be determined in step S7 that at least one candidate characteristic parameter Ci has been set in step S6 for the time series parameter Pj, the method further continues with another loop for each candidate characteristic parameter Ci set as a candidate characteristic parameter for the time series parameter Pj, and a further loop for each of the at least one second time period Nm, wherein in this loop, a step S9 of determining the candidate characteristic parameter Ci(Pj, Nm) is carried out for determining for each of the set candidate characteristic parameters Ci the values Ci(Pj,Nm), i.e. the characteristic parameters Ci for the particular time series parameter Pj and the at least one second time period Nm for each of the at least one second time period Nm, i.e. for each m. Thereafter, the loop for each of the at least one second time period Nm is left and the method continues with step S10, in which is determined if the determined candidate characteristic parameter value Ci(Pj,Nm) is similar to the characteristic parameter values Ci(Pj,Tk) for at least one m, i.e. for each of the values determined in the step S9 in the loop for each of the at least one second time period Nm. Here, the efficiency can be further increased in that the candidate characteristic parameter values Ci(Pj,Nm) are not compared to each of the parameter values Ci(Pj,Tk) as determined in the step S4 in the loop for each of the at least two first time periods Tk, but for the mean value of all determined characteristic parameter values Ci(Pj,Tk) as explained with reference to the embodiment as illustrated in FIG. 1.

Step S10 is performed in the loop for each of the candidate characteristic parameters Ci set in the step S6, and in the affirmative of step S10 for at least one candidate characteristic parameter value Ci(Pj,Nm), the method continues with the next candidate characteristic parameter Ci since the second assumption could not be confirmed for this particular candidate characteristic parameter Ci. Further, in the affirmative of step S10 for each of the different candidate characteristic parameters Ci as set in step S6, the particular time series parameter Pj is discarded analogous to step S8, since it could be determined that the second assumption of the above-mentioned two assumptions is not confirmed for all of the particular candidate characteristic parameters Ci and for the particular time series parameter Pj. Accordingly, it can be determined that the particular time series parameter Pj is not correlated to the first operation state of the system, e.g. that the particular time series parameter Pj is not correlated to the anomaly in case the method is used for the purpose of anomaly investigations.

However, if it is determined in step S10 for at least one candidate characteristic parameter Ci that at least one of the values Ci(Pj,Nm) is not similar to any of the characteristic parameter values Ci(Pj,Tk), it can be determined that the second assumption of the above-mentioned two assumptions is confirmed for at least this particular candidate characteristic parameter Ci, so that the particular time series parameter Pj is determined to be correlated with the first operation state of the system in step S11 analogous step S11 as described with reference to the method of FIG. 1.

Thereafter, the method continues for the next candidate characteristic parameter Ci of the candidate characteristic parameters Ci as set in step S6 above, and after the steps S9, S10, S11 have been performed for each of the candidate characteristic parameters Ci as set in step S6 for this particular time series parameter Pj, the loop is continued for the next time series parameter Pj. After the steps have been further performed for each of the plurality of time series parameters Pj, the loop for each of the plurality of time series parameters Pj is left and in step S12 of outputting correlation information data, the correlation information data is outputted for indicating which of the plurality of time series parameters Pj have been determined to be correlated with the first operation state of the system in step S11.

Furthermore, the correlation information data indicates, for each time series parameters Pj which has been determined to be correlated to the first operation state, for which one or more characteristic parameters Ci the two assumptions are confirmed based on which the time series parameters Pj can be determined to be correlated to the first operation state.

Figure 3:
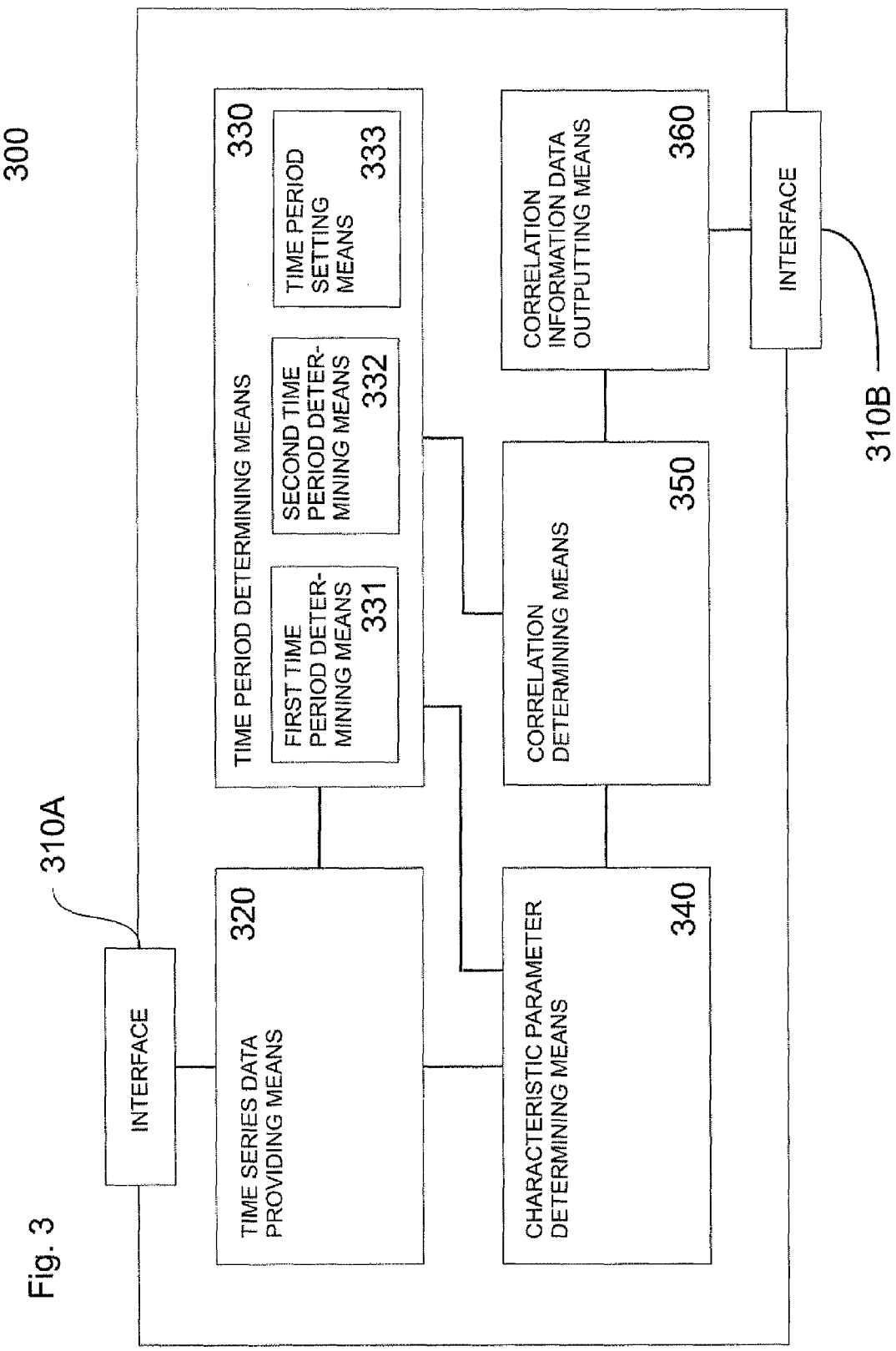
FIG. 3 shows a schematic view of an apparatus for determining which one or more time series parameters of a plurality of time series parameters relating to operation of a system are correlated with first operation state of the system according to an embodiment of the present invention.

FIG. 3 shows a schematic view of an apparatus for determining which one or more time series parameters of a plurality of time series parameters relating to operation of a system are correlated with a first operation state of the system according to an embodiment of the present invention. The apparatus 300 as shown in FIG. 3 comprises two interfaces 310A and 310B, wherein the first interface 310A is configured to receive stored time series data and/or real-time time series data. The second interface 310B is configured to output determined correlation information data and can be configured, for example, to provide the correlation information data to a printer for printing the correlation information data, e.g. in form of a list, or to a storage device for storing the determined correlation information data. Of course, the first and second interface 310A and 310B can also be combined into one interface means.

Stored time series data relating to time series of each of the plurality of time series parameters relating to the operation of the system can be, for example, received at the interface means 310A from a storage device such as a data base in which history telemetry data can be stored. Furthermore, the interface 310A can be configured to be connected to a means comprising a receiving means for receiving real-time time series data from a system, such as real-time time series data included in real-time telemetry data sent from the system such as for example, a space craft such as a space satellite or space probe, wherein the real-time time series data relates to the real-time operation of the system.

The interface 310A is connected to a time series data providing means 320 which is configured to provide time-series data including data relating to a time series of each of the plurality of time series parameters relating to the operation of the system. The time series data providing means 320 is connected to a time period determining means 330 and a characteristic parameter determining means 340 of the apparatus 300.

The time period determining means 330 comprises a first time period determining means 331, a second time period determining means 332, and a time period setting means 333. The first time period determining means 331 is configured to determine at least two first time periods T1 and T2, wherein the system is in the first operation state during the at least two first time periods T1 and T2, so that the first time period determining means 331 is configured to perform at least one of the steps S2a and S2b, and/or step S2 as described above with reference to FIGS. 1 and 2.

The second time period determining means 332 is configured to determine at least one second time period N1, wherein the system is in a second operation state during the at least one second time period, so that the second time period determining means 332 is configured to carry out at least one of the steps S3a or S3 as described with reference to FIGS. 1 and 2 above. For setting at least one of the first time periods or the second time period, the time period determining means 330 further comprises the time period setting means 333 which is configured to set at least one of the first time periods and the at least one second time period according to the above-mentioned step S3a as described with reference FIG. 1 above. Here, the time period setting means 333 can be configured such that a user (e.g. an engineer) can manually set at least one of the at least first time periods or the at least one second time period. Furthermore, the first and second time period determining means 331 and 332 can be configured to perform a determination of a time period based on the shape of a time series as explained, for example, with reference to step S2b in the method of FIG. 1. Then, the first and second time period determining means 331 and 332 are configured to perform a determination of a similarity of the shapes of different time series, for example, by performing the determination of the similarity based on dynamic time warping distances, as explained above.

The characteristic parameter determining means 340 of the apparatus 300 is configured to determine a value of a characteristic parameter relating to a characteristic of a time series of a time series parameter for a specific time period of the at least two first time periods and the at least one second time period determined by the first time period determining means 331 and the second time period determining means 332. Furthermore, the characteristic parameter determining means 340 can be configured to determine values for a plurality of characteristic parameters, respectively for each of the at least two first time periods and the at least one second time period, as explained with reference to the method according to the embodiment of FIG. 2.

Furthermore, the apparatus 300 comprises a correlation determining means 350 which is configured to determine which one or more time series parameters of a plurality of time series parameters relating to the operation of the system are correlated with the first operation state of the system by determining, for each respective time series parameter of the plurality of time series parameters, whether or not the respective time series parameter is correlated with the first operation state of the system, based on the characteristic parameters determined for each of the at least two first time periods and the at least one second time periods by the characteristic parameter determining means 340. In particular, the correlation determining means 350 is configured to determine that a respective time series parameter is correlated with the first operation state of the system, if a characteristic parameter of at least one type of characteristic parameters of the respective time series parameter determined for the at least two first time periods by the characteristic parameter determining means 340 are similar to each other but not similar to the characteristic parameter of the respective time series parameter determined for the at least one second time period by the characteristic parameter determining means 340.

Finally, the apparatus 300 comprises a correlation information data outputting means 360 which is configured to output correlation information data such that the correlation information data indicates which one or more of the plurality of time series parameters have been determined to be correlated with the first operation state of the system by the correlation determining means 350, wherein the correlation information data outputting means can be further configured to additionally add data into the correlation information data which indicates for which of the plurality of characteristic parameters (types of characteristic parameters) the correlation could be determined, i.e. for which of the different characteristic parameters it could be determined that the characteristic is similar in the at least two first time periods but not similar in the at least one second time period.

As mentioned above, the present invention is not limited to anomaly investigations in which the first operation state corresponds to anomalous operation of the system in which an anomaly occurs, but can also be applied to period characterizations such as mission phase characterizations in which the first and second operation state of the system can be two different normal operation modes of the system in which different behaviour for at least some of the plurality of time series parameters can be expected, i.e. at least one of the time series parameters should be correlated to the first operation state as it shows a different behaviour in the first and second operation state but similar behaviour in the first operation state related first time periods.

In the following, an example of such a period characterization will be described. It corresponds to an example of a realization of the method which has been described with reference to the flow chart of FIG. 2, however, applied for the purpose of period characterizations. In particular, in this example, the system is a space probe, particularly, the Venus Express Space Probe orbiting the planet Venus. The first operation state corresponds to an operation state of the Venus Express Space Probe in which the solar arrays are positioned such that they have an inclination and power demand that forces the production of electric power at the maximum capacity of the solar arrays, wherein the second operation state corresponds to an operation state in which the solar arrays of the Venus Express Space Probe are fully illuminated and produce excess power.

This period characterization has been performed for characterizing the operation of the solar array and occurring thermal patterns which could be correlated with the different operational states as discussed above for properly accounting for thermal effects. The following time periods had been set as the first time periods:

from 2007-04-12 02:48:00.000 to 2007-04-12 02:52:00.000 from 2009-02-02 08:09:41.000 to 2009-02-02 08:13:41.000 from 2007-04-16 06:35:08.625 to 2007-04-16 06:39:08.625 and the following time periods have been set as second time periods:

from 2007-12-04 02:09:00.000 to 2007-12-04 02:13:00.000
from 2007-12-04 06:00:00.000 to 2007-12-04 06:04:00.000
from 2009-02-04 07:11:34.000 to 2009-02-04 07:15:34.000

As mentioned above, the first operation state corresponds to an operation state in which the solar arrays of the Venus Express Space Probe are inclined with a such a power demand so that and power is produced at the maximum capacity, wherein the Venus Express Space Probe was in the first operation state during the above-mentioned first time periods, and the second operation state of the Venus Express Space Probe corresponds to the operation state in which the solar arrays are illuminated and electric power is produced in excess, wherein the Venus Express Space Probe has been in the second operation state during the above second time periods.

The results are illustrated in the FIGS. 4A to 4F for a first time series parameter, in the FIGS. 5A to 5F for a second time series parameter, and in the FIGS. 6A to 6F for a third time series parameter, wherein the first, second, and third time series parameters have been determined to be correlated with the first operation state of the Venus Express Space Probe based on the results shown in the Figures.

Figure 4A:
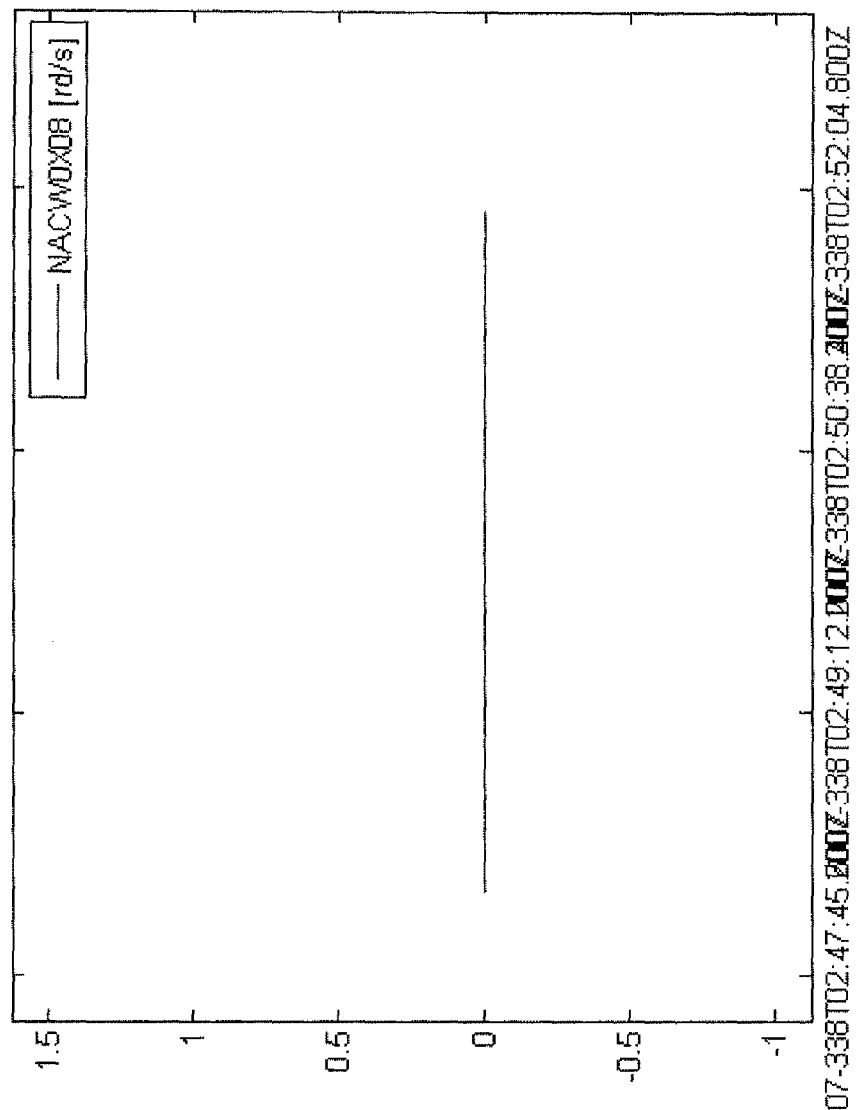
Figure 4C:
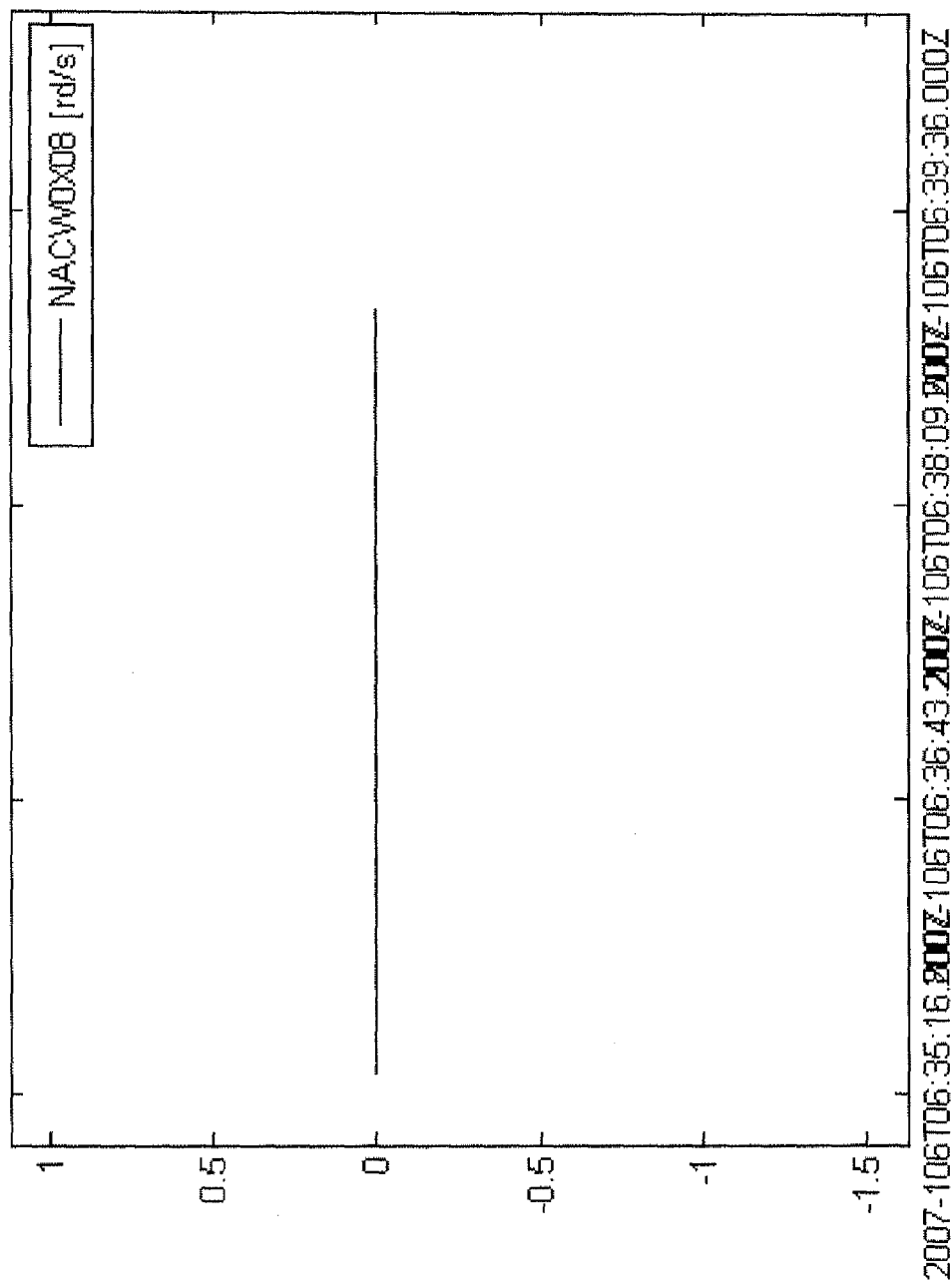
Figure 4D:
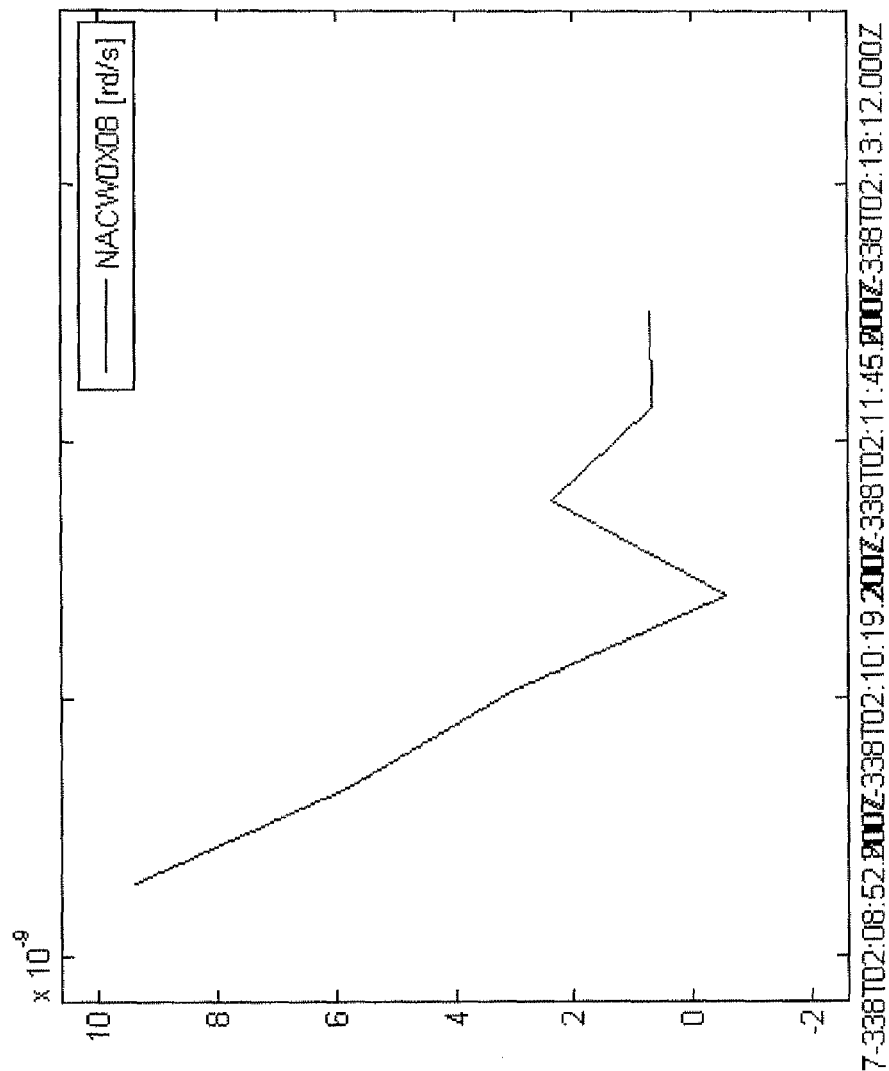
FIGS. 4D, 4E, and 4F illustrate the behaviour of a time series of the first time series parameter during a first, a second, and a third second time period according to an example of the method according to the present invention.
Figure 4E:
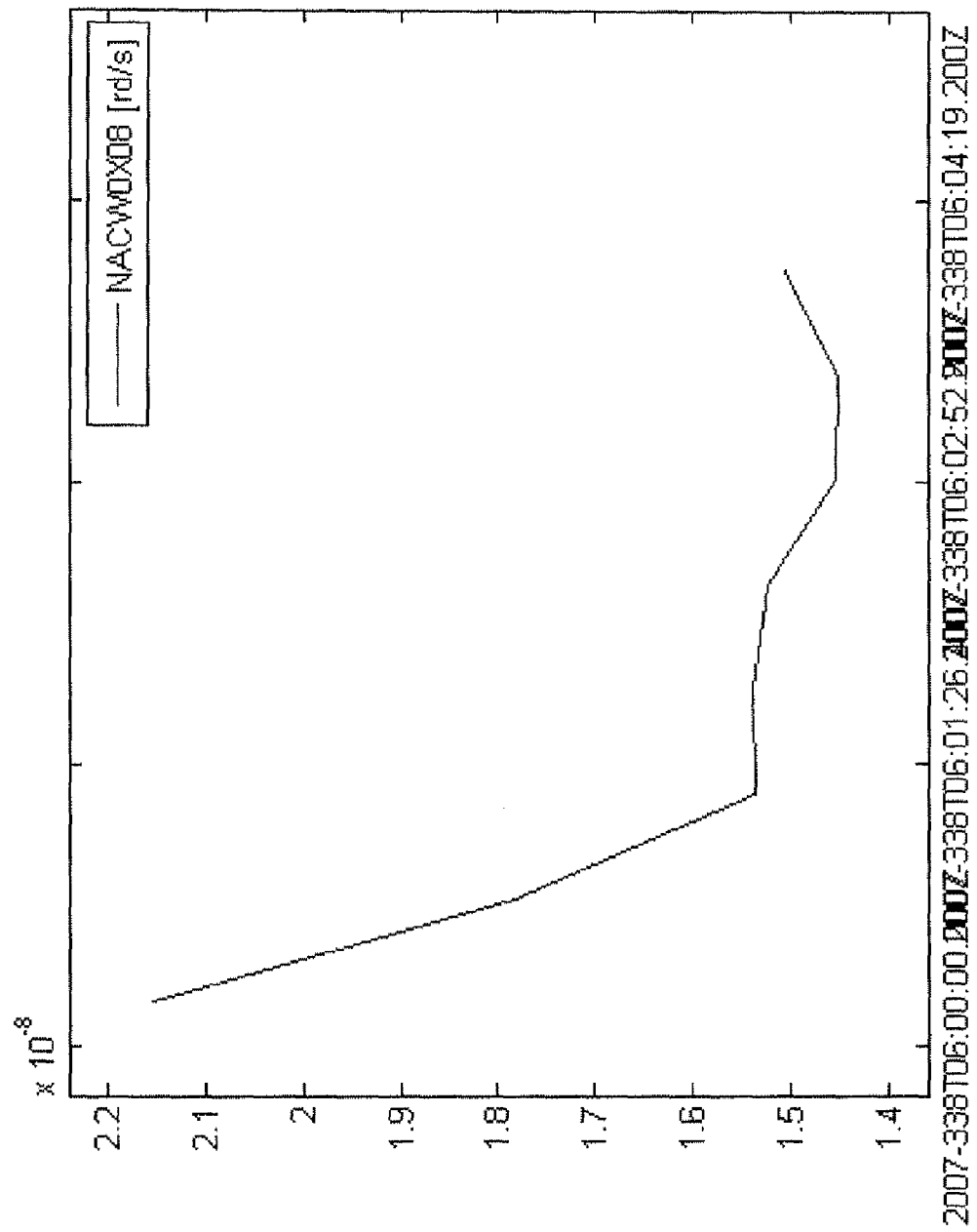
Figure 4F:
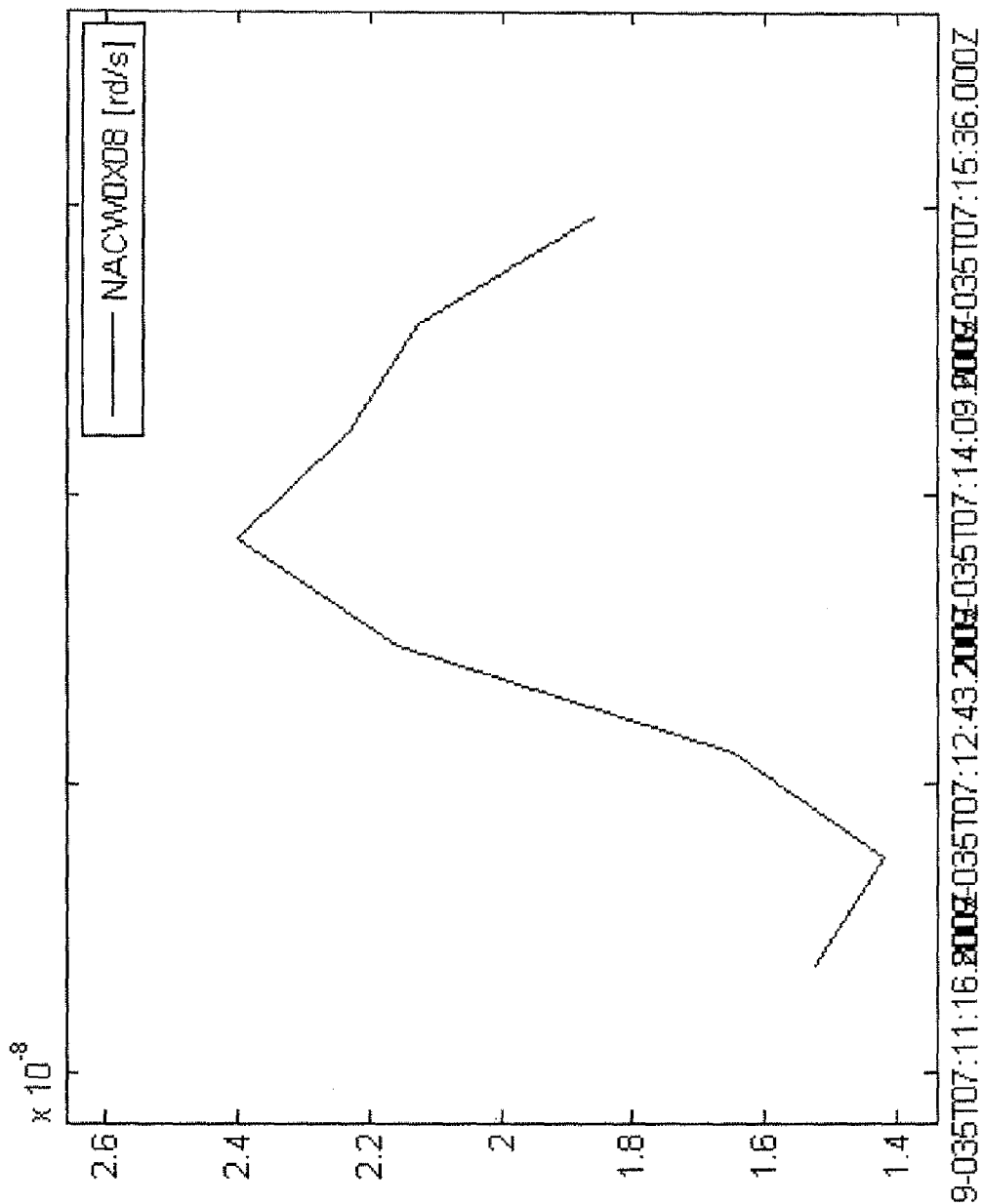
Figure 5D:
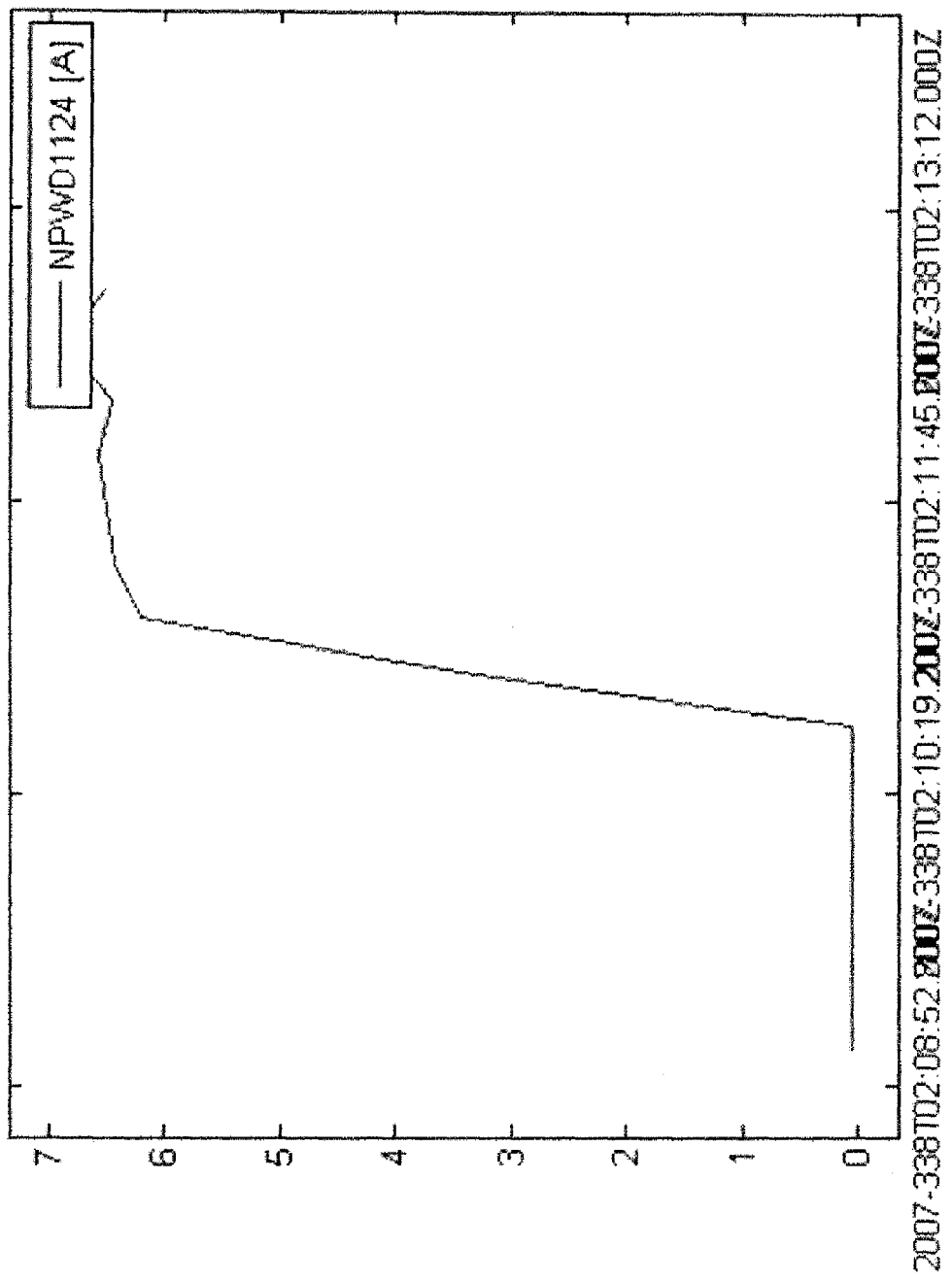
FIGS. 5D, 5E, and 5F illustrate the behaviour of a time series of the second time series parameter during a first, a second, and a third second time period according to an example of the method according to the present invention.
Figure 5E:
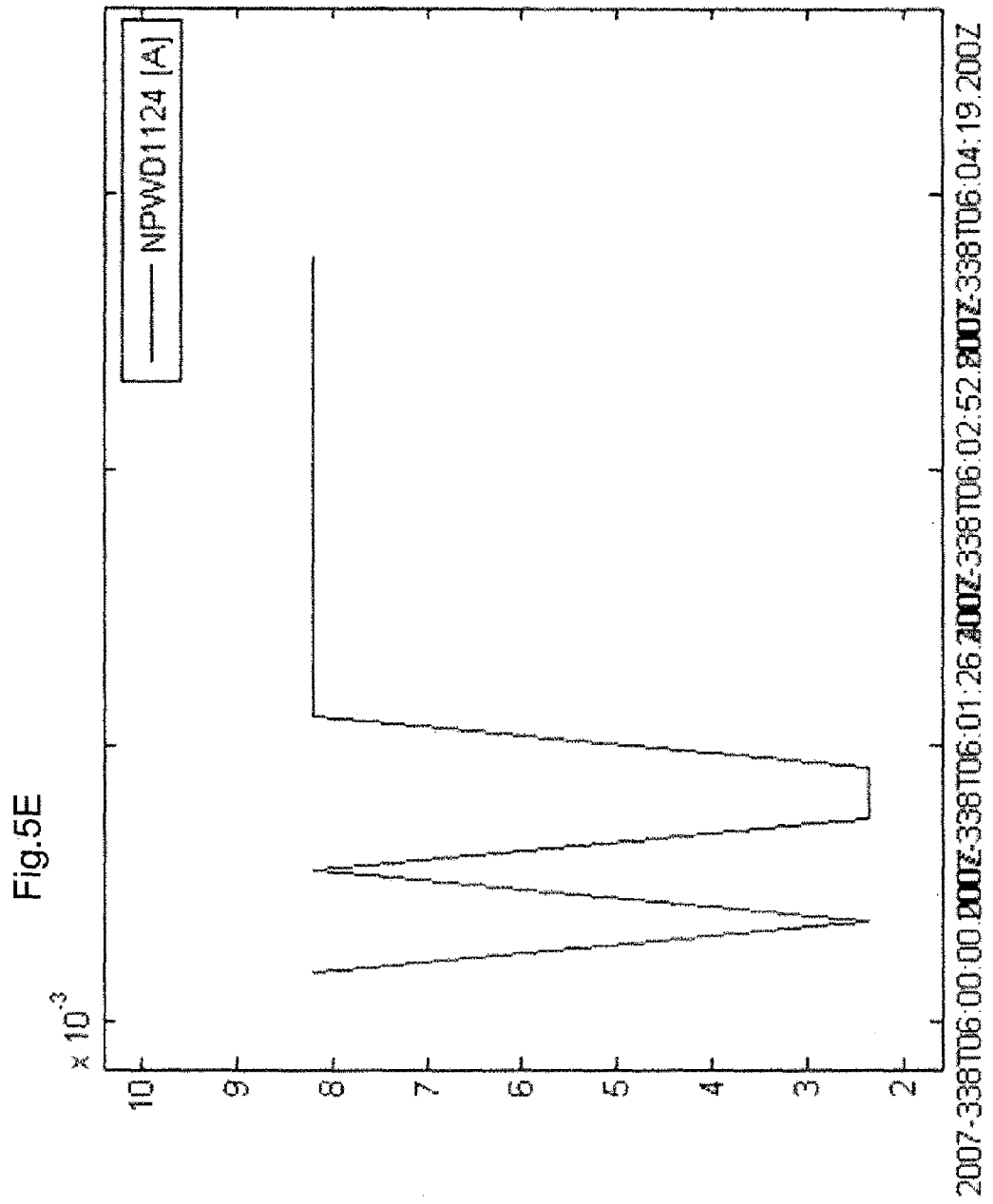
Figure 5F:
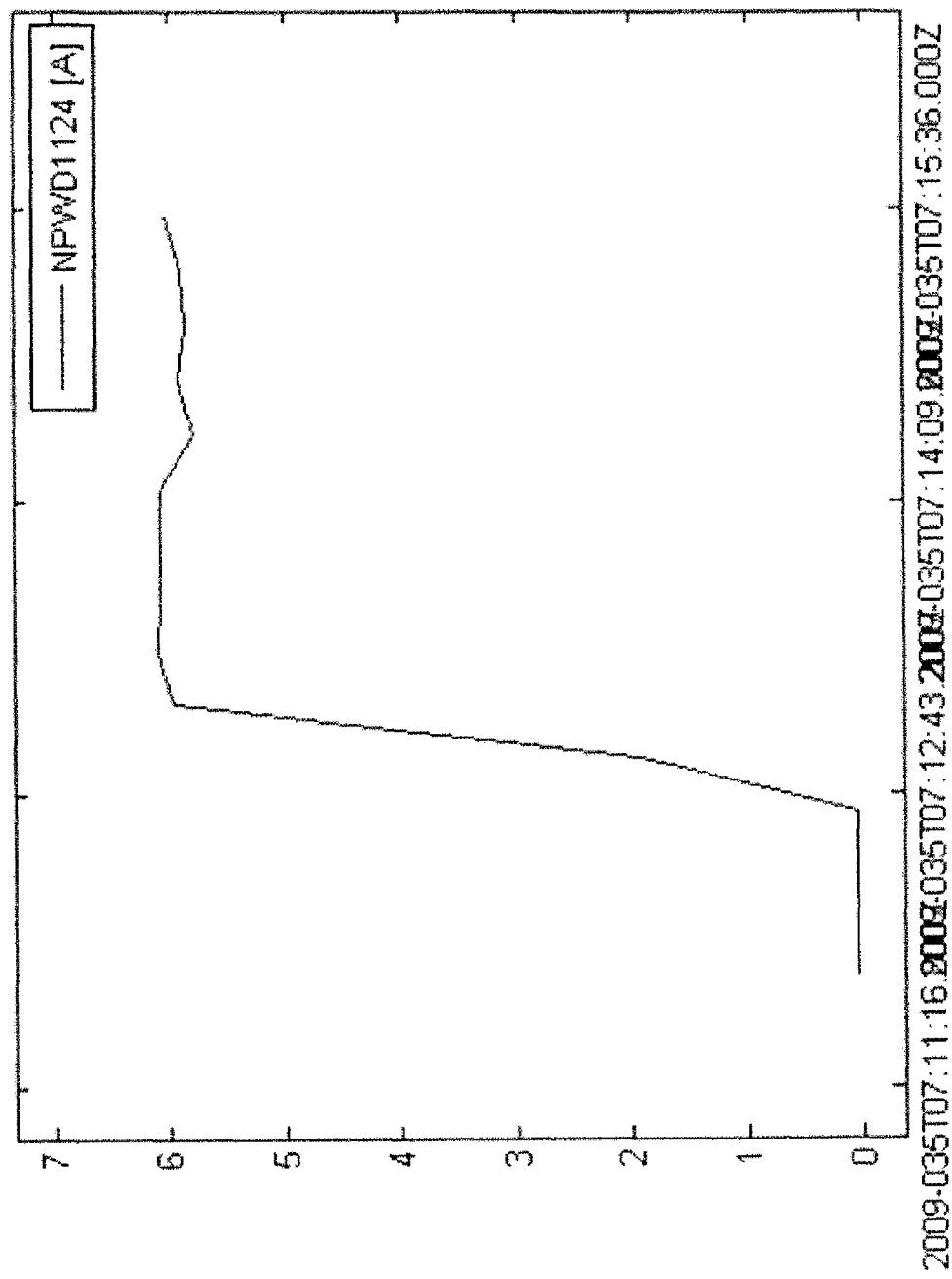
Figure 6B:
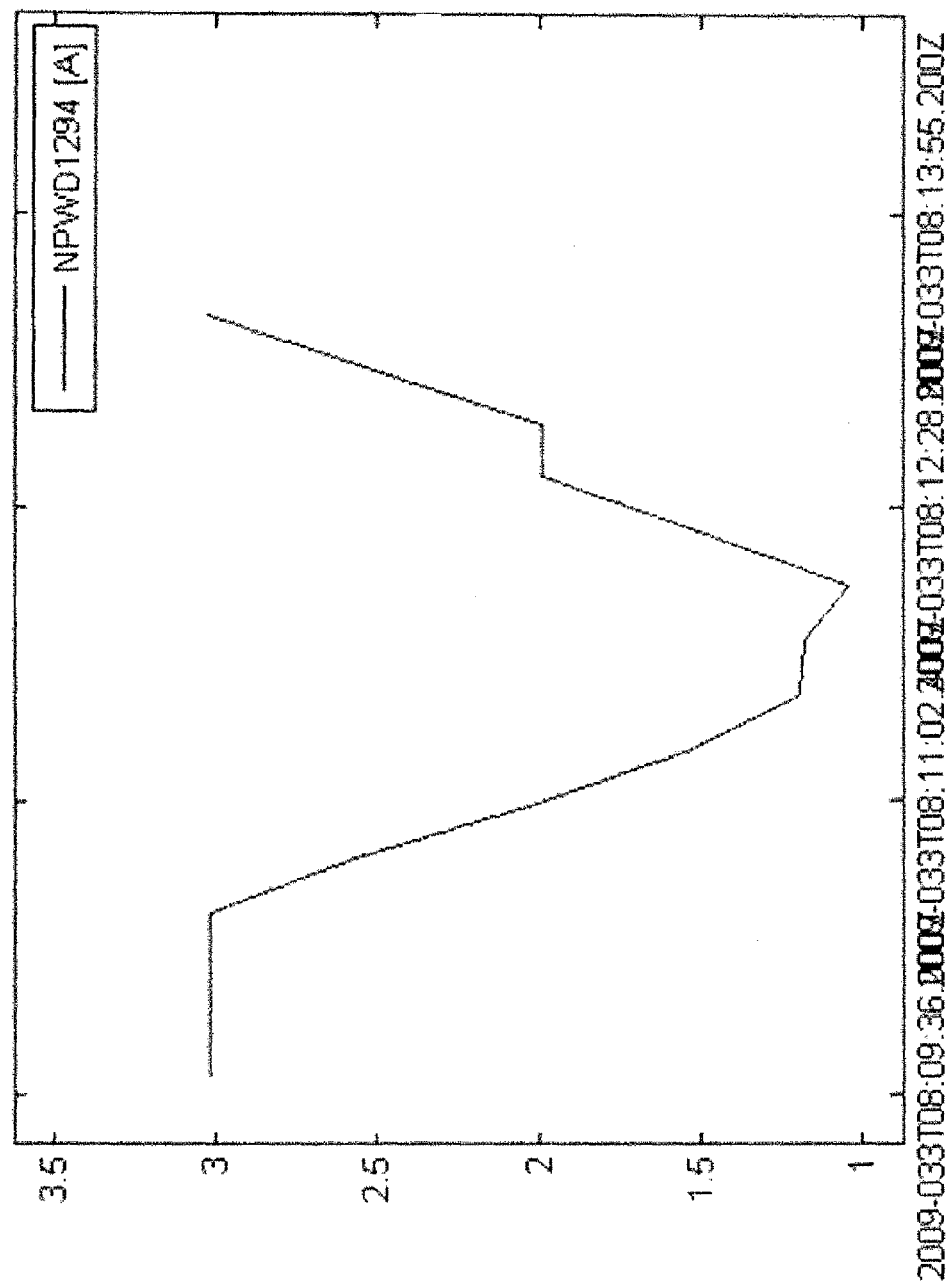
Figure 6C:
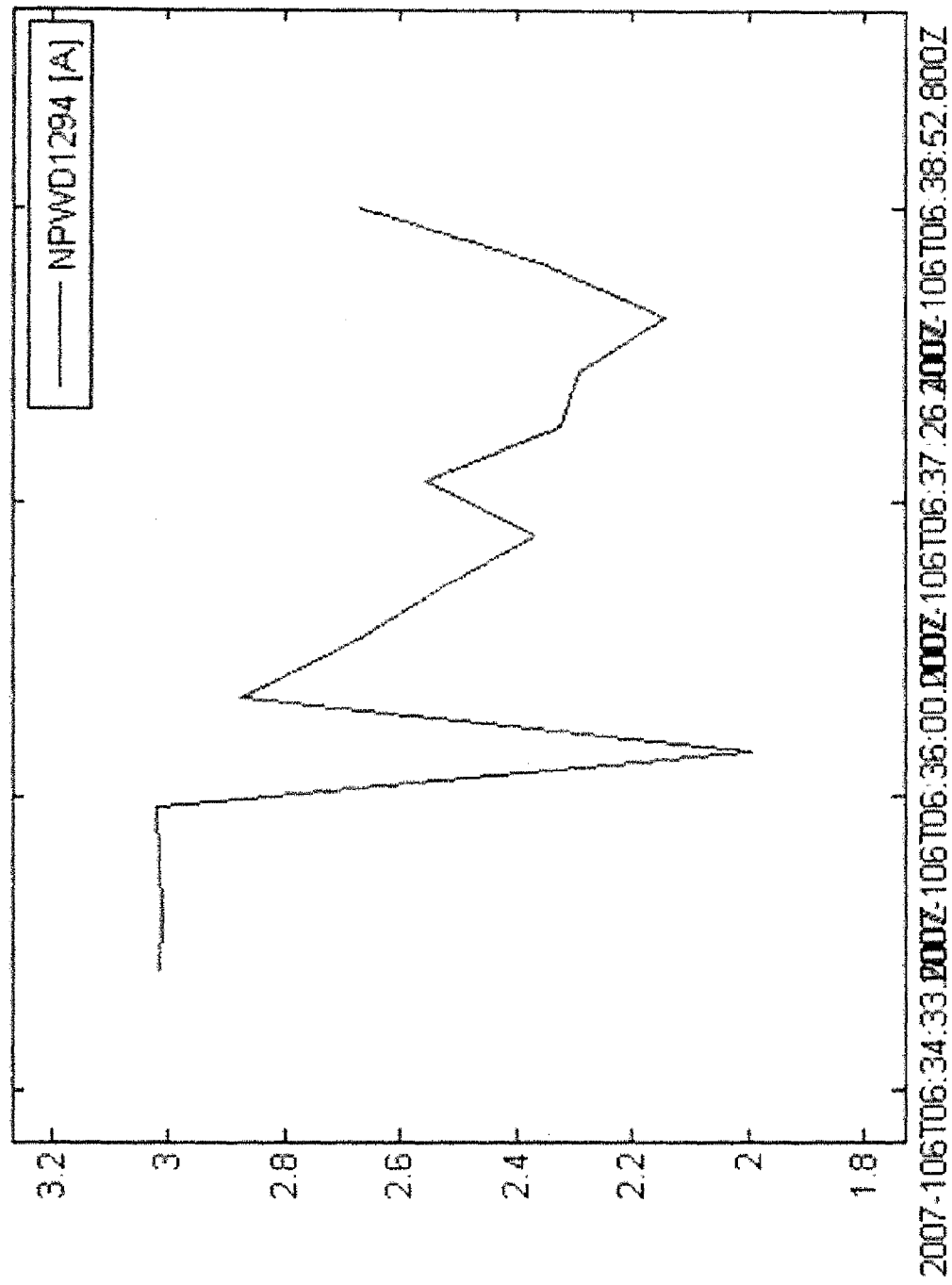
Figure 6D:
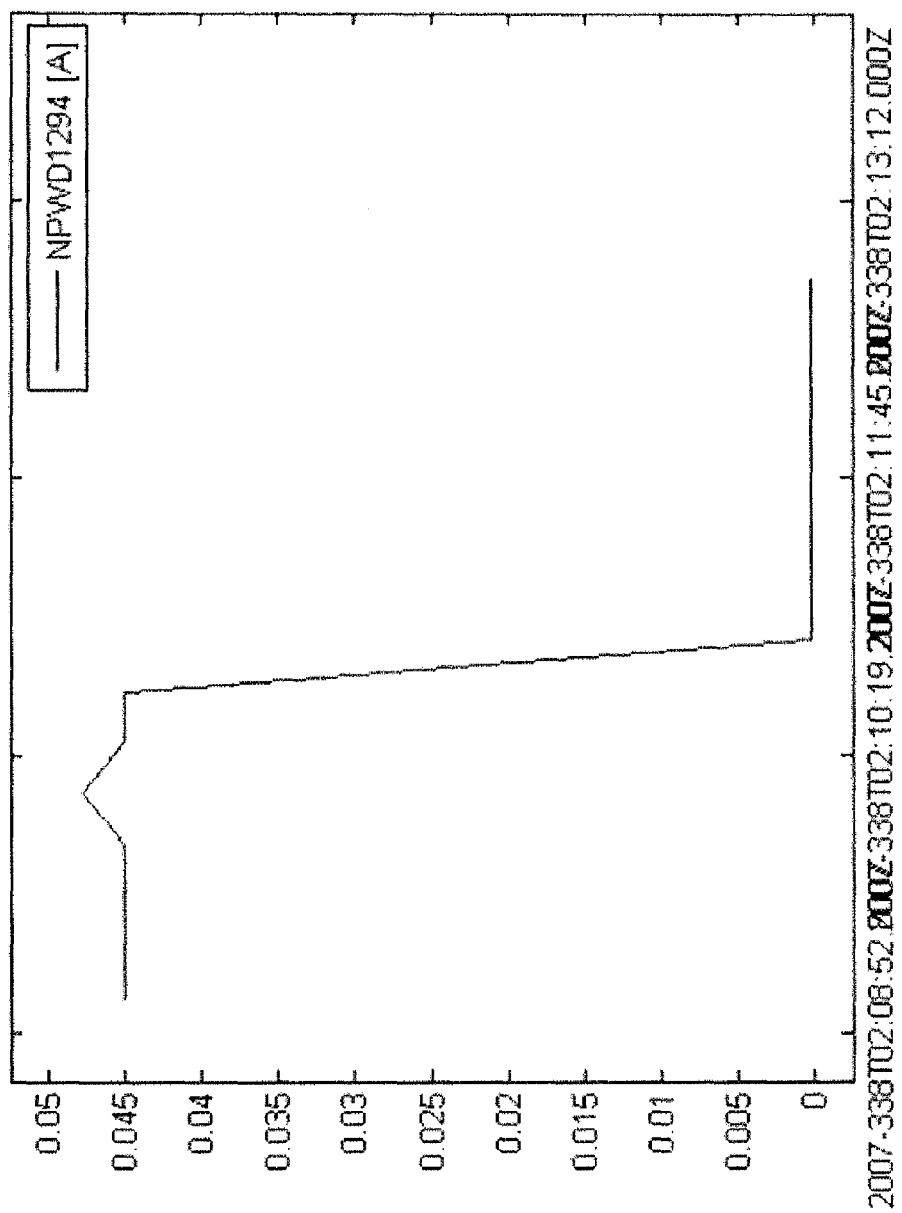
FIGS. 6D, 6E, and 6F illustrate the behaviour of a time series of the third time series parameter during a first, a second, and a third second time period according to an example of the method according to the present invention.
Figure 6E:
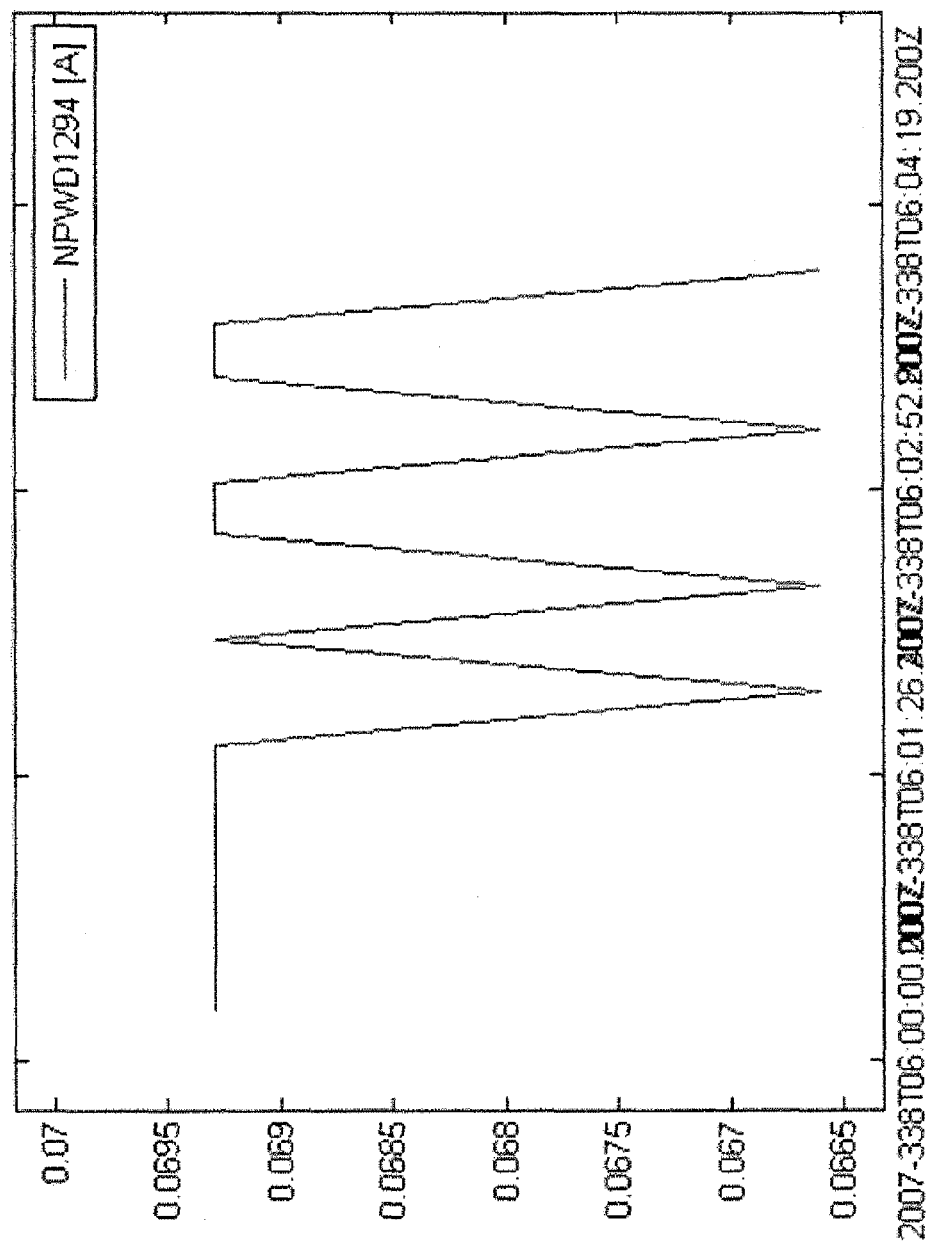
Figure 6F:
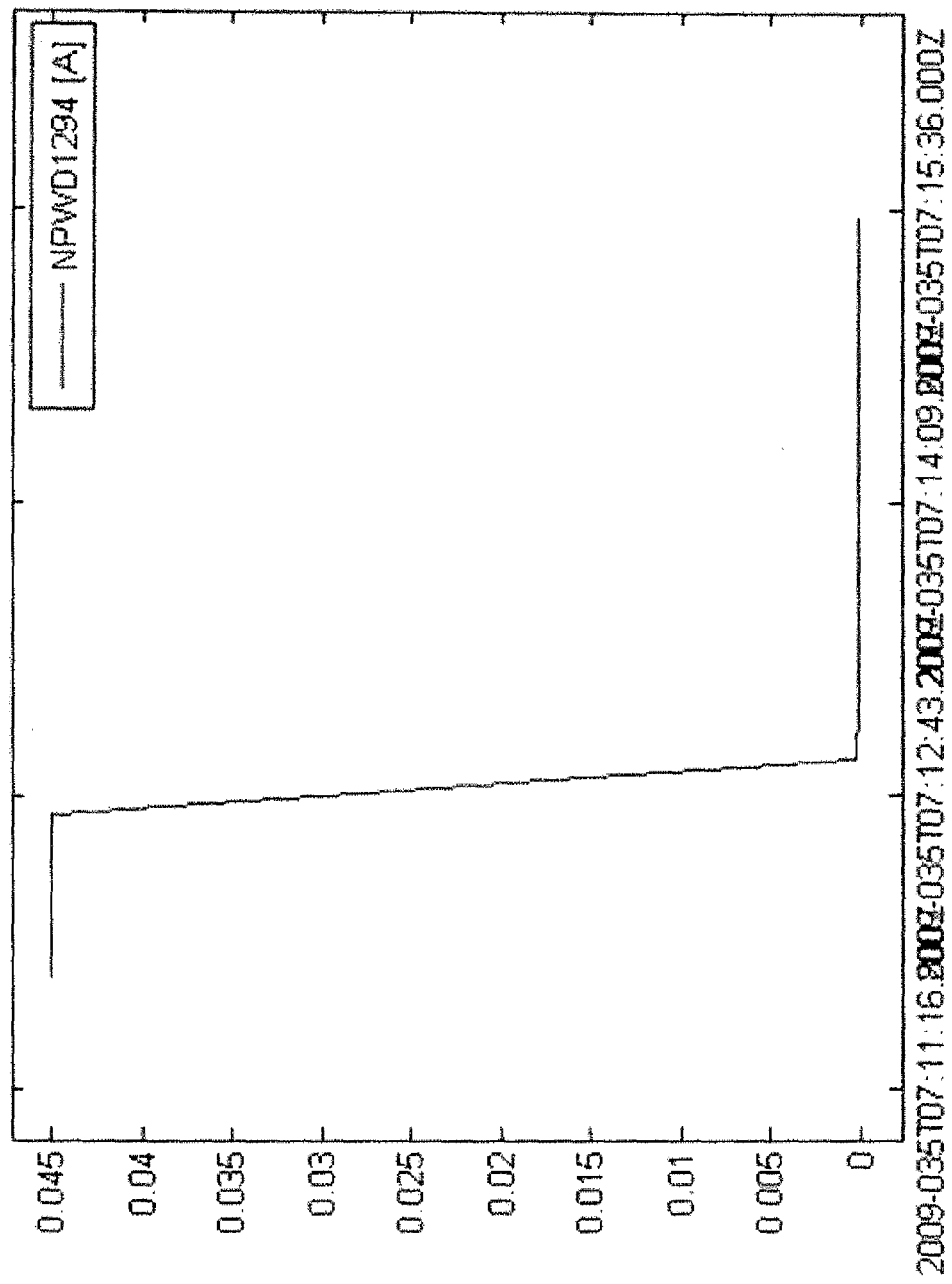

Here, the FIGS. 4A to 4C illustrate the time series of the first time series parameter during the first time periods, and the FIGS. 4D to 4F show the time series of the first time series parameter during the second time periods as given above. The first time series parameter according to this example is labelled NACWOX08 and relates to the estimated Gyro drift along a predetermined X axis measured in the units of radians per second. Further, the FIGS. 5A to 5C show the time series of the second time series parameter during the first time periods and the FIGS. 5D to 5F show the time series of the second time series parameter during the second time periods as given above. The second time series parameter according to this example is labelled NPWD1124 and relates to the discharge current of a battery of the space probe measured in the unit of amperes. Further, the FIGS. 6A to 6C illustrate the time series of the third time series parameter during the first time periods, and the FIGS. 6D to 6F illustrate the time series of the third time series parameter during the second time periods as given above. The third time series parameter according to this example is labelled NPWD1294 and relates to the charge current of another battery of the space probe measured in the unit of amperes.

It can be seen especially from FIGS. 5A to 5F and FIGS. 6A to 6F that the time series in the different first time periods and the different second time periods are different, so that it becomes apparent that a shape analysis is not appropriate for a determination of the correlation of the time series parameter with the first operation state, since the shapes are not similar to each other, even in the first time periods or the second time periods, respectively, although the system is in the same operation state. Still, it could be determined that the first, second and third time series parameter are correlated with the first operation state of the Venus Express Space Probe.

In particular, for the first time series parameter, it could be determined that the first time series parameter is correlated with the first operation state of the Venus Express Space Probe, since the two assumptions could be confirmed for the first time series parameter based on the characteristic of the maximum value minus slope in the respective time periods (i.e. similar values in the first time periods but different to the values in the second time periods).

For the second time series parameter, it could be determined that the second time series parameter is correlated with the first operation state of the Venus Express Space Probe based on the characteristic parameters average value, maximum value, parameter range, standard deviation, and maximum minus slope (i.e. similar values in the first time periods but different to the values in the second time periods).

Further, for the third time series parameter, it could be determined that the third time series parameter is correlated to the first operation state of the Venus Express Space Probe based on the characteristic parameters average value, maximum value and minimum minus slope (i.e. similar values in the first time periods but different to the values in the second time periods).

The determination of correlated parameters in the above examples could be performed without any dependency on guesswork, knowledge, and experience of an engineer. Still, the determination of correlated parameters could be efficiently, automatically, and reliably performed according to a method according to the embodiment of the present invention as illustrated with reference to FIG. 2, however, used for the purpose of period characterization.

Features, components and specific details of the structures of the above-described embodiments may be exchanged or combined to form further embodiments optimized for the respective application. As far as those modifications are readily apparent for an expert skilled in the art, they shall be implicitly disclosed by the above description of preferred embodiments and examples without specifying explicitly every possible combination, for the sake of conciseness of the present description.

The invention claimed is:

1. Method for determining which one or more time series parameters of a plurality of time series parameters relating to operation and/or behaviour of a system over time are correlated with a first state and/or first condition of the system, comprising:
    providing time series data including data relating to a time series of each of the plurality of time series parameters;
    determining at least two first time periods, wherein the system is in the first state and/or first condition during the at least two first time periods;
    determining at least one second time period, wherein the system is in a second state and/or second condition during the at least one second time period;
    determining, for each respective time series parameter of the plurality of time series parameters, a first characteristic parameter relating to a first characteristic of the time series of the respective time series parameter for each of the at least two first time periods and the at least one second time period; and
    determining, using a computer processor, which one or more time series parameters of the plurality of time series parameters relating to the operation and/or behaviour of the system over time are correlated with the first state and/or first condition of the system by determining, for each respective time series parameter of the plurality of time series parameters, whether or not the respective time series parameter is correlated with the first state and/or first condition of the system based on the first characteristic parameters of the respective time series parameter determined for each of the at least two first time periods and the at least one second time period.

2. Method according to claim 1, wherein the respective time series parameter is determined to be correlated with the first state and/or first condition of the system, if the first characteristic parameters of the respective time series parameter determined for the at least two first time periods are similar to each other but not similar to the first characteristic parameter of the respective time series parameter determined for the at least one second time period.

3. Method according to claim 1, wherein the method further comprises determining, for each respective time series parameter of the plurality of time series parameters, at least a second characteristic parameter relating to a second characteristic of the time series of the respective time series parameter for each of the at least two first time periods and the at least one second time period, wherein the respective time series parameter is further determined to be correlated with the first state and/or first condition of the system, if the at least second characteristic parameters of the respective time series parameter determined for the at least two first time periods are similar to each other but not similar to the second characteristic parameter of the respective time series parameter determined for the at least one second time period.

4. Method according to claim 1, wherein the similarity of characteristic parameters of the respective time series parameter determined for the at least two first time periods and the at least one second time period is determined based on a variation coefficient, wherein determined characteristic parameters of the respective time series parameter are determined to be similar if the variation coefficient is smaller or equal to a predetermined variation coefficient threshold value.

5. Method according to claim 1, wherein the first characteristic parameter is one of average value of the time series in the respective time period, standard deviation of the time series in the respective time period, variance of the time series in the respective time period, maximum value of the time series in the respective time period, minimum value of the time series in the respective time period, time series parameter range in the respective time period, slope of the time series in the respective time period, maximum minus slope of the time series in the respective time period, minimum minus slope of the time series in the respective time period, maximum plus slope of the time series in the respective time period, minimum plus slope of the time series in the respective time period, skewness of the time series in the respective time period and kurtosis of the time series in the respective time period.

6. Method according to claim 1, wherein the method for determining which one or more time series parameters of a plurality of time series parameters relating to operation and/or behaviour of the system are correlated with the first state and/or first condition of the system is used for the purpose of anomaly investigations, wherein the first state and/or first condition of the system relates to an anomalous operation mode and an anomaly occurs during each of the at least two first time periods, and the second state and/or second condition of the system relates to a normal operation mode and the anomaly does not occur during the at least one second time period.

7. Method according to claim 1, wherein the method for determining which one or more time series parameters of a plurality of time series parameters relating to operation and/or behaviour of the system are correlated with the first state and/or first condition of the system is used for the purpose of period characterizations, wherein the first state and/or first condition of the system during the at least two first time periods relates to a first normal operation mode and the second operation state of the system during the at least one second time period relates to a second normal operation mode different from the first normal operation mode.

8. Method according to claim 1, wherein determining at least two first time periods comprises setting a first of the at least two first target time periods and determining at least a second of the at least two first target time periods based on a shape of the time series for at least one of the plurality of time series parameters in the first of the at least two first time periods, wherein the second of the at least two first time periods is determined such that a shape of the time series for the at least one of the plurality of time series parameters in the second of the at least two first time periods is similar to the shape of the time series for the at least one of the plurality of time series parameters in the first of the at least two first target time periods.

9. Method according to claim 8, wherein the similarity of the shapes of the time series for the at least one of the plurality of time series parameters in the first and second of the at least two first time periods is determined based on one or more dynamic time warping distances.

10. Method according to claim 9, wherein the similarity of shapes of the time series for the at least one of the plurality of time series parameters in the first and second of the at least two first time periods is determined based on a ranking of the lowest dynamic time warping distances of the shapes of the time series for the at least one of the plurality of time series parameters in the first and second of the at least two first time periods.

11. Method according to claim 1, wherein the method for determining which one or more time series parameters of a plurality of time series parameters relating to operation and/or behaviour of the system are correlated with the first state and/or first condition of the system is used for the purpose of anomaly investigations, wherein the first state and/or first condition of the system relates to an anomalous operation mode and an anomaly occurs during one of the two first time periods and the second state and/or second condition of the system relates to a normal operation mode and the anomaly does not occur during the at least one second time period, and wherein the method further comprises detecting the occurrence of an anomaly in real-time time series data relating to a current operation of the system, wherein the occurrence of the anomaly is detected in the real-time time series data, if the shape of the time series for the at least one of the plurality of time series parameters included in the real-time series data is determined to be similar to the shape of the time series for the at least one of the plurality of time series parameters in the one of the at least two first time periods.

12. Method according to claim 1, wherein the system is one or a group of: a plant, a power plant, a vehicle, a space craft, a space shuttle, a space station, a satellite, a system of a plurality of satellites and/or base stations, a space probe, a system of a plurality of space probes, a plane, an aircraft, or a device relating to robotics, or at least part thereof.

13. Method according to claim 1, wherein the system is one of: a communication network, a computer network, a traffic network or a power supply network.

14. Method according to claim 1, wherein the system is a financial system such as the stock market.

15. Method according to claim 1, wherein the system is a system of one or more medical devices and the time series data relates to a medical condition of a patient.

16. Method according to claim 1, wherein the time series data is comprised in telemetry data relating to the operation of a technical system over time.

17. Apparatus for determining which one or more time series parameters of a plurality of time series parameters relating to operation and/or behaviour of a system over time are correlated with a first state and/or first condition of the system according to a method according to claim 1, wherein the apparatus comprises:

a time period determining means comprising:

a first time period determining means for determining at least two first time periods, wherein the system is in the first state and/or first condition during the at least two first time periods; and a second time period determining means for determining at least one second time period, wherein the system is in a second state and/or second condition during the at least one second time period;

a characteristic parameter determining means for determining, for each respective time series parameter of the plurality of time series parameters, a first characteristic parameter relating to a first characteristic of the time series of the respective time series parameter for each of the at least two first time periods and the at least one second time period; and a correlation determining means for determining which one or more time series parameters of the plurality of time series parameters relating to the operation and/or behaviour of the system are correlated with the first state and/or first condition of the system by determining, for each respective time series parameter of the plurality of time series parameters, whether or not the respective time series parameter is correlated with the first state and/or first condition of the system based on the first characteristic parameters of the respective time series parameter determined for each of the at least two first time periods and the at least one second time period.

18. Apparatus according to claim 17, wherein the time period determining means further comprises a time period setting means for setting at least one of the two first time periods and the at least one second time period.

19. Computer program product comprising a non-transitory computer-readable medium and a computer software program stored therein, wherein the computer software program is stored in a sequence of states corresponding to a sequence of commands, which are configured to be executed by a data processing means of a data processing apparatus such that an apparatus according to claim 17 is provided.

* * * * *